(12) United States Patent
Molander et al.

(10) Patent No.: US 10,091,358 B1
(45) Date of Patent: Oct. 2, 2018

(54) GRAPHICAL USER INTERFACE FOR CALL CENTER ANALYSIS

(71) Applicant: Splunk, Inc., San Francisco, CA (US)

(72) Inventors: Troy Elliott Molander, San Marcos, CA (US); Steven Shaun McIntyre, Queen Creek, AZ (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 15/633,699

(22) Filed: Jun. 26, 2017

(51) Int. Cl.
*H04M 3/00* (2006.01)
*H04M 5/00* (2006.01)
(Continued)

(52) U.S. Cl.
CPC ........ *H04M 3/5175* (2013.01); *G06F 3/0482* (2013.01); *G06F 3/04847* (2013.01);
(Continued)

(58) Field of Classification Search
CPC .............. G06F 3/0482; G06F 3/04847; G06Q 10/06393; G06Q 10/06; G06Q 10/06316; G06Q 30/016; G06T 11/206; H04M 2201/42; H04M 2203/402; H04M 2203/558; H04M 3/2254; H04M 3/36; H04M 3/5133; H04M 3/5175; H04M 3/5238; H04M 3/2281; H04M 3/323; H04M 3/4217; H04M 3/4285; H04M 3/42195; H04M 3/493; H04M 3/4931; H04M 3/4933; H04M 3/4935; H04M 3/4938; H04M 3/42221; H04M 3/51; H04M 3/5158; H04M 3/5166; H04M 3/5183; H04M 3/5191; H04M 3/523; H04M 3/5232; H04M 3/5233; H04M 3/5235; G10L 15/00; H04L 51/02; H04L 51/046; H04L 51/24; H04L 51/30
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05,
(Continued)

(56) References Cited

U.S. PATENT DOCUMENTS 6,868,525 B1 * 3/2005 Szabo ............... G06F 17/30067
705/14.53
7,530,020 B2 * 5/2009 Szabo ............... G06F 17/30067
707/999.003
(Continued)

OTHER PUBLICATIONS

Non Final Office Action dated Dec. 28, 2017 issued in U.S. Appl. No. 15/633,697 (13 pages).

*Primary Examiner* — Khai N Nguyen
(74) *Attorney, Agent, or Firm* — Ferguson Braswell Fraser Kubasta PC

(57) ABSTRACT

One or more embodiments related to a method of generating a graphical user interface. The method includes obtaining a metric interface hierarchy having multiple nodes, where each node defines a visualization for the node, and the metric interface hierarchy defines an ordering on the nodes. The method further includes traversing the metric interface hierarchy starting with a selected node to obtain a subhierarchy, and creating the graphical user interface from a general interface by populating the general interface with the visualization from each node in the subhierarchy according to the ordering. The method further includes providing the graphical user interface.

30 Claims, 21 Drawing Sheets

(51) Int. Cl.
*H04M 3/51* (2006.01)
*G06F 3/0484* (2013.01)
*G06T 11/20* (2006.01)
*G06F 3/0482* (2013.01)
*H04M 3/22* (2006.01)
*H04M 3/36* (2006.01)

(52) U.S. Cl.
CPC .......... *G06T 11/206* (2013.01); *H04M 3/2254* (2013.01); *H04M 3/36* (2013.01); *H04M 2201/42* (2013.01); *H04M 2203/402* (2013.01); *H04M 2203/558* (2013.01)

(58) Field of Classification Search
USPC ............ 379/266.06, 266.07, 266.08, 266.09, 379/266.1
See application file for complete search history.

(56) References Cited

U.S. PATENT DOCUMENTS

| | | | | |
|---|---|---|---|---|
| 7,574,659 | B2* | 8/2009 | Szabo | G06F 17/30067 705/14.69 |
| 8,073,777 | B2* | 12/2011 | Barry | G06F 11/0709 370/389 |
| 8,630,399 | B2* | 1/2014 | D'Arcy | H04M 3/51 379/201.01 |
| 9,154,627 | B2* | 10/2015 | Placiakis | H04M 3/5175 |
| 9,197,599 | B1* | 11/2015 | Barry | G06F 11/0709 |
| 9,531,875 | B2* | 12/2016 | Cecchi | H04M 3/4936 |
| 9,584,659 | B2* | 2/2017 | Cecchi | H04M 3/4936 |
| 9,609,131 | B2* | 3/2017 | Placiakis | H04M 3/5233 |
| 9,723,148 | B2* | 8/2017 | Conley | H04M 3/5191 |
| 9,736,301 | B2* | 8/2017 | Cecchi | H04M 3/4936 |
| 9,742,920 | B2* | 8/2017 | Cecchi | H04M 3/5232 |
| 2002/0184069 | A1* | 12/2002 | Kosiba | G06Q 10/04 705/7.38 |
| 2004/0059701 | A1* | 3/2004 | Fedorov | H04M 3/5183 |
| 2005/0165766 | A1* | 7/2005 | Szabo | G06F 17/30067 |
| 2005/0216421 | A1* | 9/2005 | Barry | G06F 11/0709 705/64 |
| 2006/0161816 | A1* | 7/2006 | Gula | H04L 41/065 714/39 |
| 2006/0288023 | A1* | 12/2006 | Szabo | G06F 17/30067 |
| 2007/0258329 | A1* | 11/2007 | Winey | A63B 53/04 367/140 |
| 2011/0261055 | A1* | 10/2011 | Wong | H04L 41/0609 345/440 |
| 2012/0082303 | A1* | 4/2012 | D'Arcy | H04M 3/51 379/201.02 |
| 2013/0051547 | A1* | 2/2013 | Chavez | G06Q 10/101 379/265.09 |
| 2013/0051548 | A1* | 2/2013 | Chavez | G06Q 10/101 379/265.09 |
| 2014/0067375 | A1* | 3/2014 | Wooters | G06F 17/28 704/9 |
| 2014/0211933 | A1* | 7/2014 | Vymenets | H04M 3/5183 379/265.06 |
| 2014/0233719 | A1* | 8/2014 | Vymenets | H04M 3/5183 379/265.03 |
| 2014/0334619 | A1* | 11/2014 | Placiakis | H04M 3/5233 379/265.12 |
| 2014/0365504 | A1* | 12/2014 | Franceschini | G06F 17/30958 707/748 |
| 2015/0334007 | A1* | 11/2015 | Miyoshi | H04L 45/28 370/216 |
| 2016/0028893 | A1* | 1/2016 | Placiakis | H04M 3/5233 379/265.12 |
| 2016/0269554 | A1* | 9/2016 | Cecchi | H04M 3/4936 |
| 2016/0269555 | A1* | 9/2016 | Cecchi | H04M 3/4936 |
| 2016/0352904 | A1* | 12/2016 | Conley | H04M 3/5191 |
| 2017/0013126 | A1* | 1/2017 | Cecchi | H04M 3/4936 |
| 2017/0099200 | A1* | 4/2017 | Ellenbogen | H04L 43/04 |
| 2017/0102866 | A1* | 4/2017 | Calvillo | G06F 3/04847 |
| 2017/0109679 | A1* | 4/2017 | Zhao | G06Q 10/06393 |
| 2017/0109681 | A1* | 4/2017 | Zhao | G06Q 10/06398 |
| 2017/0126892 | A1* | 5/2017 | Cecchi | H04M 3/5232 |
| 2017/0214798 | A1* | 7/2017 | Placiakis | H04M 3/5233 |
| 2017/0262165 | A9* | 9/2017 | Calvillo | G06F 3/04847 |

* cited by examiner

GRAPHICAL USER INTERFACE FOR CALL CENTER ANALYSIS

BACKGROUND

A call center provides a centralized virtual and/or physical location to handle communications with customers. In particular, when a customer has a problem or question for a company, the customer may contact the call center and communicate with an employee who assists the person with the problem or question. The employees of the call center are given various roles, such as agents, supervisors, and directors. The agents of the call center provide the first level of interaction with customers. Agents often follow scripts or are trained in a specific set of rules. Supervisors monitor and evaluate the agents. The call center director manages the end to end operations of the call center.

Customers contact the call center through communication channels, such as phone, chat, and other channels. At the call center side, the communication channels to agents are controlled by various devices. The devices manage the routing and connection of the employees of the call center to the customers.

DETAILED DESCRIPTION

Figure 1:
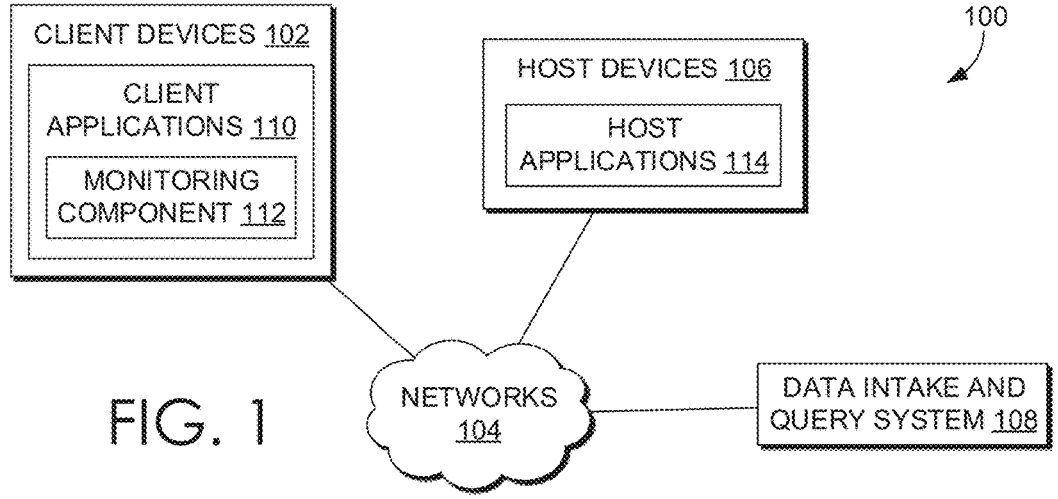
FIG. 1 illustrates a networked computer environment in which an embodiment may be implemented.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, one or more embodiments are directed to determining a current interaction metric on a per group basis for the call center. The current interaction metric identifies how the call center is currently operating. The current interaction metric may further provide information for optimizing the current state of the call center.

In one or more embodiments are further directed to generating a graphical user interface from a general interface. The graphical user interface may be generated using a metric interface hierarchy having multiple ordered nodes. Each node defines a corresponding visualization for the node. The method for generating the graphical user interface may be used to display the current interaction metric in accordance with disclosed embodiments.

Embodiments are described herein according to the following outline:

1.0. General Overview
2.0. Operating Environment
2.1. Host Devices
2.2. Client Devices
2.3. Client Device Applications
2.4. Data Server System 2.5. Data Ingestion
  2.5.1. Input
  2.5.2. Parsing
  2.5.3. Indexing
2.6. Query Processing
2.7. Field Extraction
2.8. Data Modelling
2.9. Acceleration Techniques
  2.9.1. Aggregation Technique
  2.9.2. Keyword Index
  2.9.3. High Performance Analytics Store
  2.9.4. Accelerating Report Generation
2.10. Data Center Monitoring
2.11. Cloud-Based System Overview
2.12. Searching Externally Archived Data
  2.12.1. ERP Process Features
3.0. Call Center Metrics
4.0. Graphical User Interface Generation

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters forms a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system 100 and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device 102 may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's 102 operating state, including monitoring network traffic sent and received from the client device 102 and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system 108, such as a system 108. In such cases, the provider of the system 108 can implement the custom code so that performance data generated by the monitoring functionality is sent to the system 108 to facilitate analysis of the performance data by a developer of the client application 110 or other users.

In an embodiment, the custom monitoring code may be incorporated into the code of a client application 110 in a number of different ways, such as the insertion of one or more lines in the client application 110 code that call or otherwise invoke the monitoring component 112. As such, a developer of a client application 110 can add one or more lines of code into the client application 110 to trigger the monitoring component 112 at desired points during execution of the application. Code that triggers the monitoring component 112 may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application 110, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device 102 based on a request from the client device 102 to download the application.

Examples of functionality that enables monitoring performance of a client device 102 are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device 102 operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device 102.

In an embodiment, the monitoring component 112 may also monitor and collect other device profile information including, for example, a type of client device 102, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
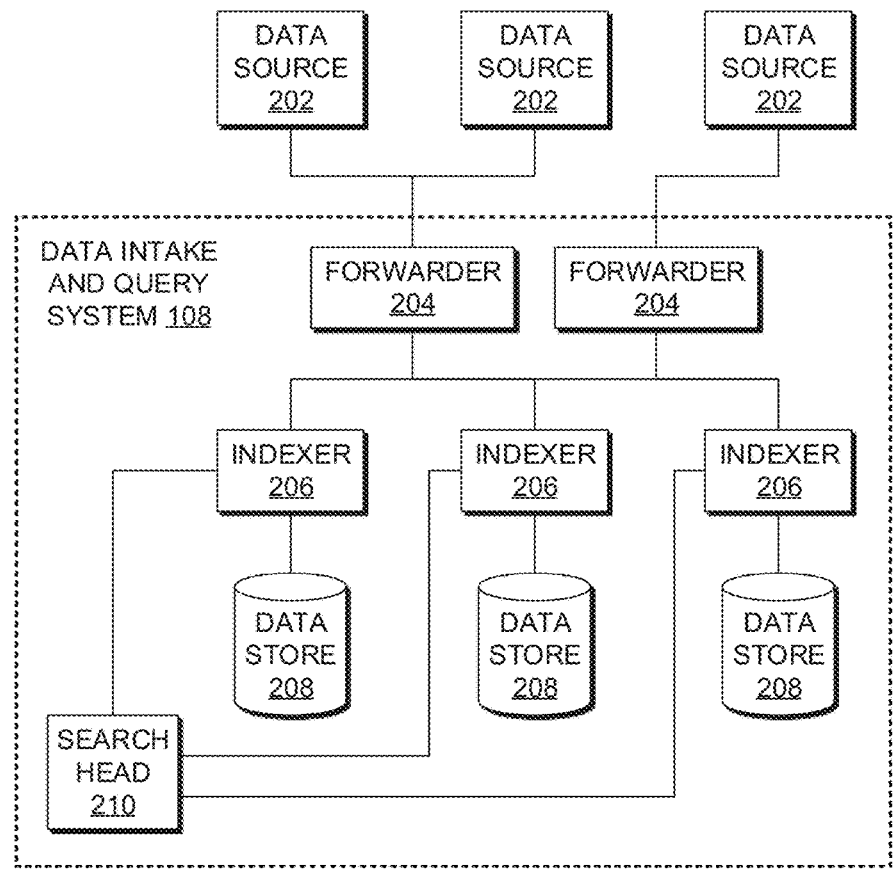
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders 204 and indexers 206 can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers 206. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer 206. For example, a forwarder 204 may perform keyword extractions on raw data or parse raw data to create events. A forwarder 204 may generate time stamps for events. Additionally, or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Data Ingestion

Figure 3:
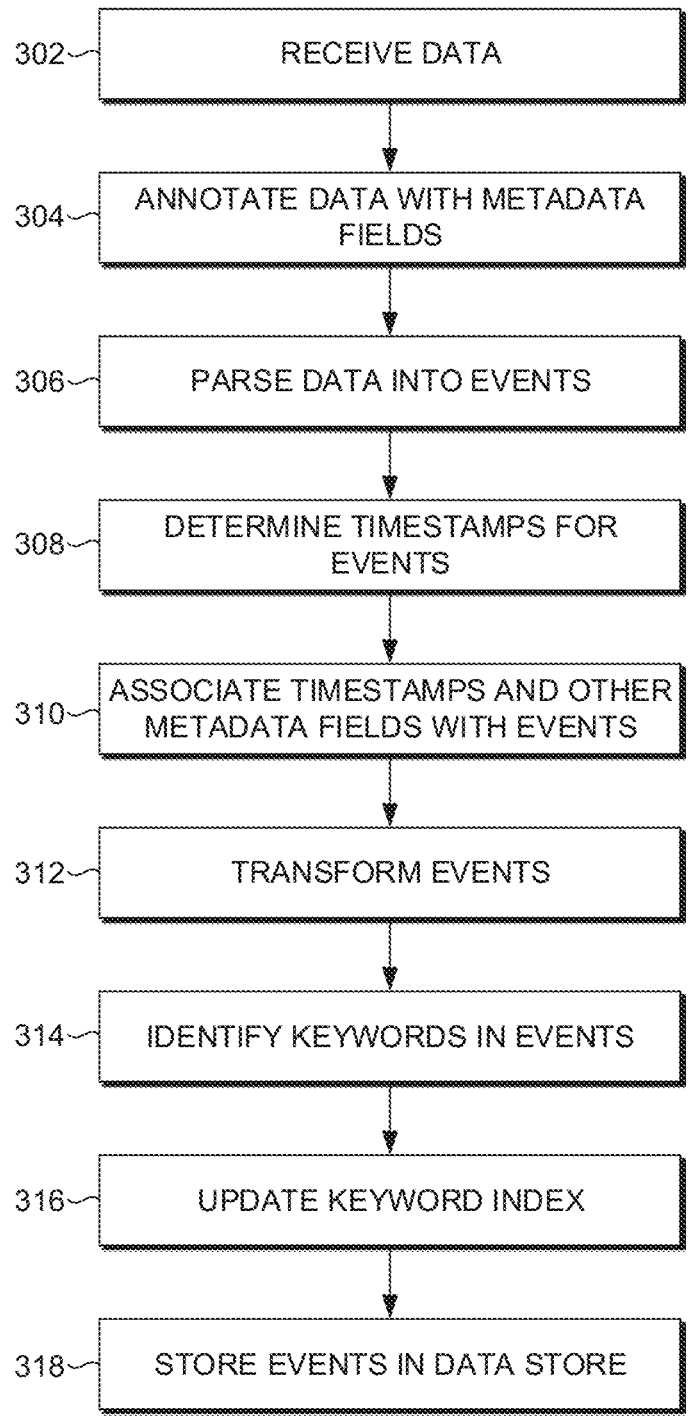
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally, or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
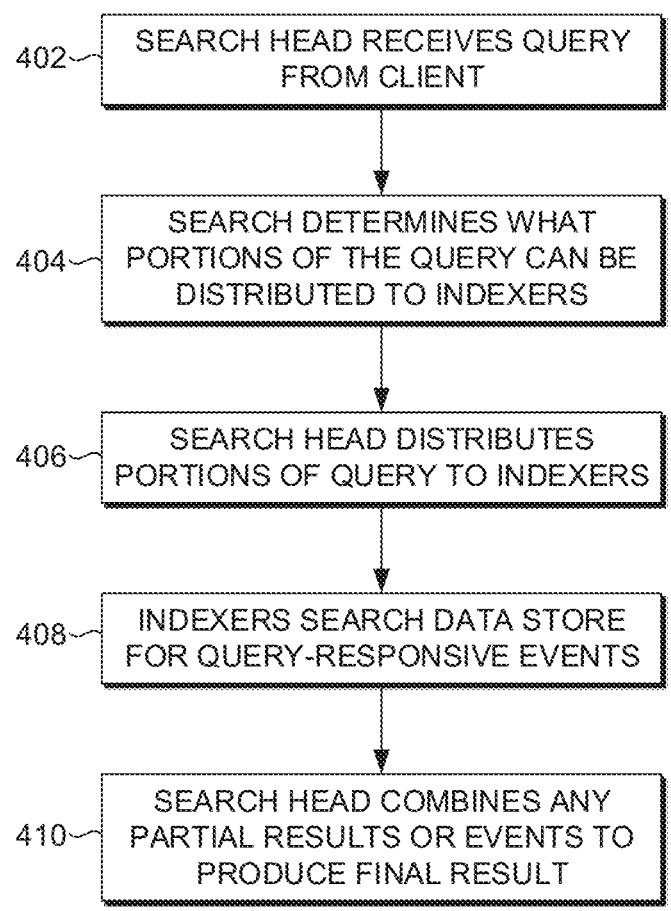
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
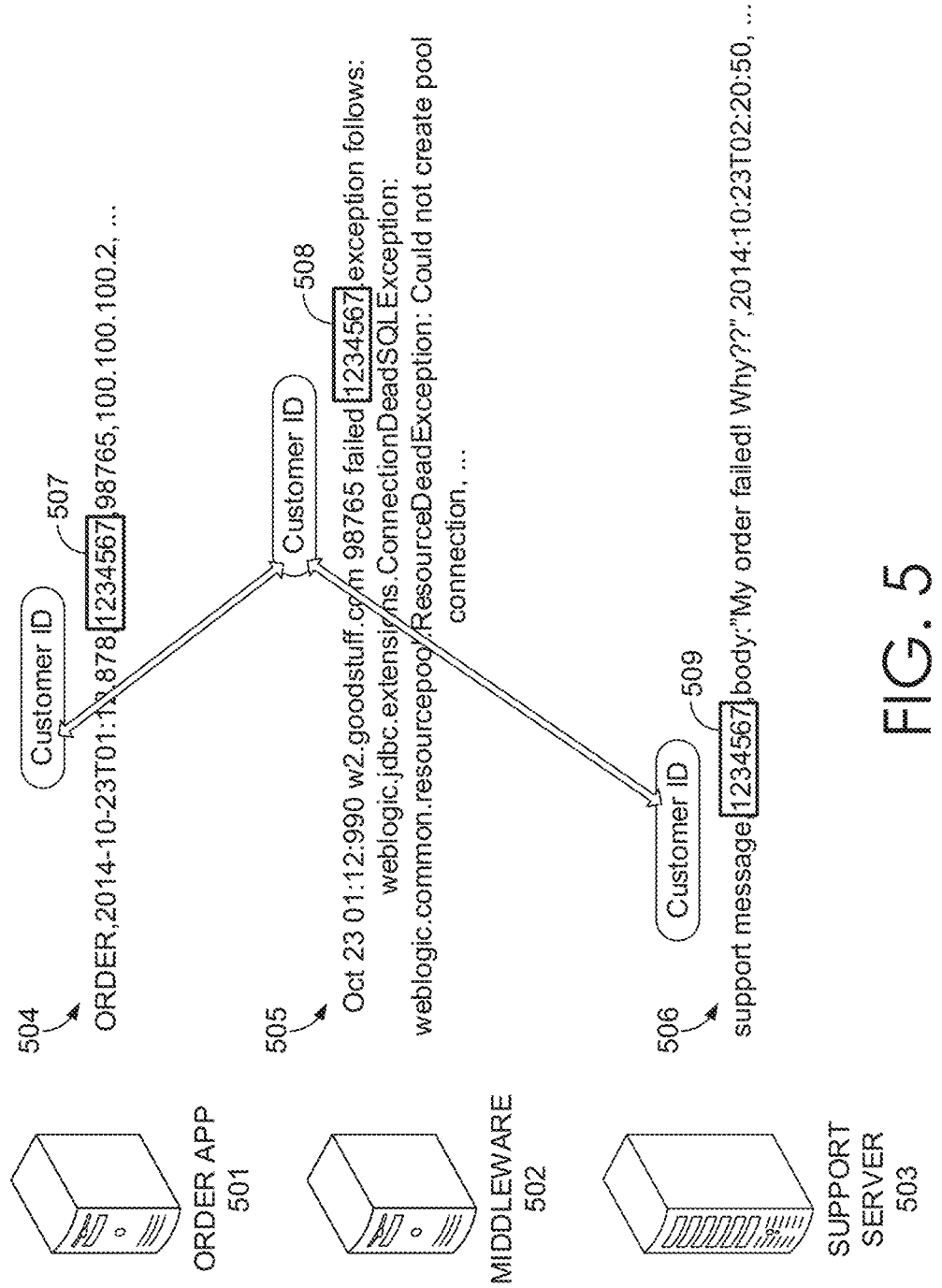
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports.

The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.9. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.9.1. Aggregation Technique

Figure 6:
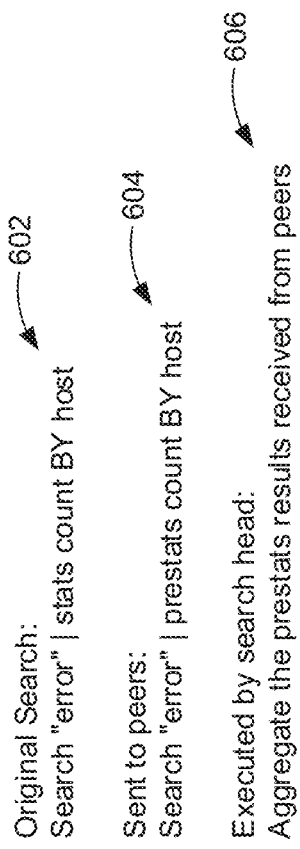
FIG. 6 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 6 illustrates how a search query 602 received from a client at a search head 210 can split into two phases, including: (1) subtasks 604 (e.g., data retrieval or simple filtering) that may be performed in parallel by indexers 206 for execution, and (2) a search results aggregation operation 606 to be executed by the search head when the results are ultimately collected from the indexers.

During operation, upon receiving search query 602, a search head 210 determines that a portion of the operations involved with the search query may be performed locally by the search head. The search head modifies search query 602 by substituting "stats" (create aggregate statistics over results sets received from the indexers at the search head) with "prestats" (create statistics by the indexer from local results set) to produce search query 604, and then distributes search query 604 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 606 to form a single search result set. By executing the query in this manner, the system effectively distributes the computational operations across the indexers while minimizing data transfers.

2.9.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.9.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.9.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criterion, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.10. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems).

2.11. Cloud-Based System Overview

The example data intake and query system 108 described in reference to FIG. 2 comprises several system components, including one or more forwarders 204, indexers 206, and search heads 210. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder 204, an indexer 206, a search head 210, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system 108 instead may be provided as a cloud-based service. In this context, a cloud-based service refers to a service hosted by one more computing resources that are accessible to end users over a network, for example, by using a web browser or other application on a client device 102 to interface with the remote computing resources. For example, a service provider may provide a cloud-based data intake and query system 108 by managing computing resources configured to implement various aspects of the system (e.g., forwarders 204, indexers 206, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 7:
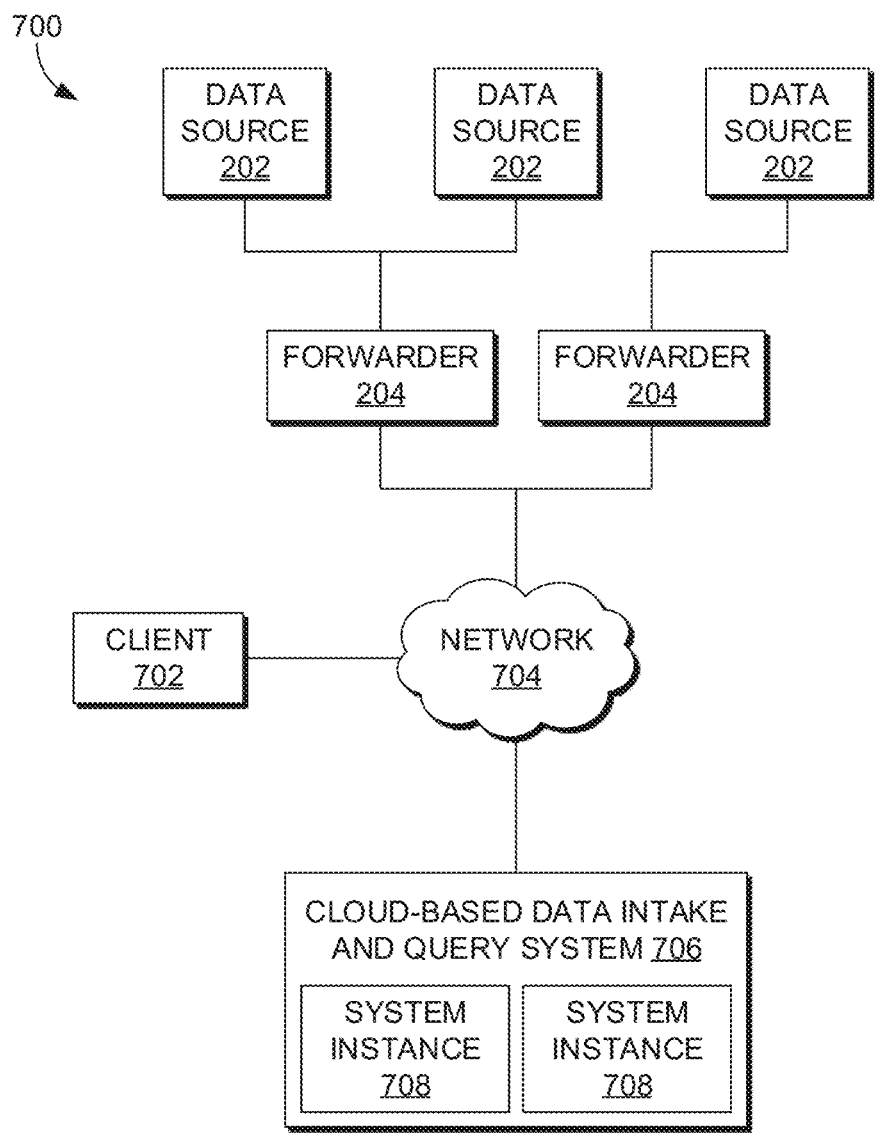
FIG. 7 illustrates a block diagram of an example cloud-based data intake and query system in which an embodiment may be implemented.

FIG. 7 illustrates a block diagram of an example cloud-based data intake and query system 706. Similar to the system of FIG. 2, the networked computer system 700 includes input data sources 202 and forwarders 204. These input data sources 202 and forwarders 204 may be in a subscriber's private computing environment. Alternatively, they might be directly managed by the service provider as part of the cloud service. In the example system 700, one or more forwarders 204 and client devices 702 are coupled to a cloud-based data intake and query system 706 via one or more networks 704. Network 704 broadly represents one or more LANs, WANs, cellular networks, intranetworks, internetworks, etc., using any of wired, wireless, terrestrial microwave, satellite links, etc., and may include the public Internet, and is used by client devices 702 and forwarders 204 to access the system 706. Similar to the system of 108, each of the forwarders 204 may be configured to receive data from an input source and to forward the data to other components of the system 706 for further processing.

In an embodiment, a cloud-based data intake and query system 706 may comprise a plurality of system instances 708. In general, each system instance 708 may include one or more computing resources managed by a provider of the cloud-based system 706 made available to a particular subscriber. The computing resources comprising a system instance 708 may, for example, include one or more servers or other devices configured to implement one or more forwarders 204, indexers 206, search heads 210, and other components of a data intake and query system 108, similar to system 108. As indicated above, a subscriber may use a web browser or other application of a client device 702 to access a web portal or other interface that enables the subscriber to configure an instance 708.

Providing a data intake and query system 108 as described in reference to system 108 as a cloud-based service presents a number of challenges. Each of the components of a system 108 (e.g., forwarders 204, indexers 206 and search heads 210) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 708) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.12. Searching Externally Archived Data

Figure 8:
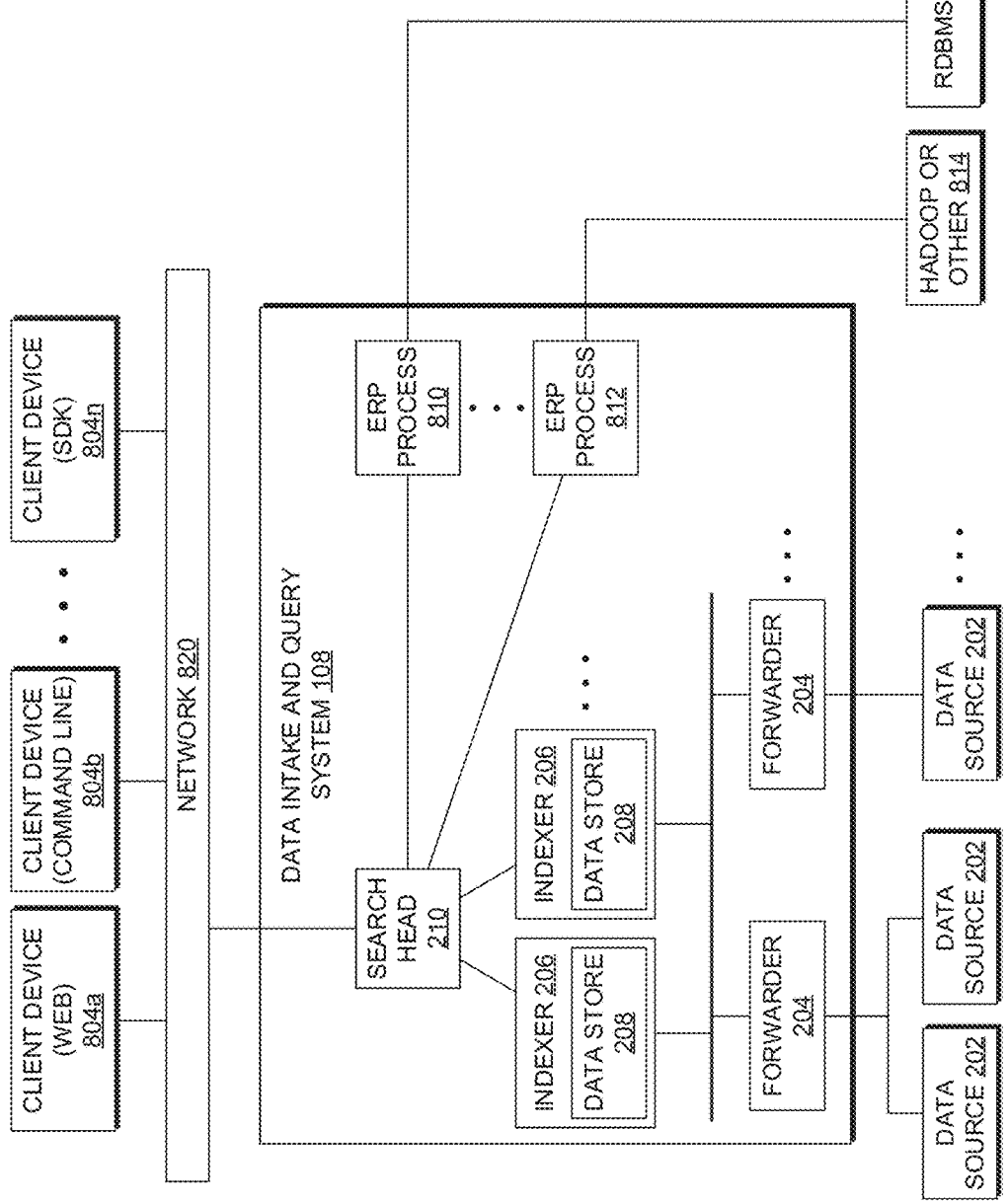
FIG. 8 illustrates a block diagram of an example data intake and query system that performs searches across external data systems in accordance with the disclosed embodiments.

FIG. 8 shows a block diagram of an example of a data intake and query system 108 that provides transparent search facilities for data systems that are external to the data intake and query system 108. Such facilities are available in the HUNK® system provided by Splunk Inc. of San Francisco, Calif. HUNK® represents an analytics platform that enables business and IT teams to rapidly explore, analyze, and visualize data in Hadoop 814 and NoSQL data stores 208.

The search head 210 of the data intake and query system 108 receives search requests from one or more client devices 804 over network connections 820. As discussed above, the data intake and query system 108 may reside in an enterprise location, in the cloud, etc. FIG. 8 illustrates that multiple client devices 804a, 804b, . . . , 804n may communicate with the data intake and query system 108. The client devices 804 may communicate with the data intake and query system 108 using a variety of connections. For example, one client device 804 in FIG. 8 is illustrated as communicating over an Internet (Web) protocol, another client device 804 is illustrated as communicating via a command line interface, and another client device 804 is illustrated as communicating via a system developer kit (SDK).

The search head 210 analyzes the received search request to identify request parameters. If a search request received from one of the client devices 804 references an index maintained by the data intake and query system 108, then the search head 210 connects to one or more indexers 206 of the data intake and query system 108 for the index referenced in the request parameters. That is, if the request parameters of the search request reference an index, then the search head 210 accesses the data in the index via the indexer 206. The data intake and query system 108 may include one or more indexers 206, depending on system access resources and requirements. As described further below, the indexers 206 retrieve data from their respective local data stores 208 as specified in the search request. The indexers 206 and their respective data stores 208 can comprise one or more storage devices and typically reside on the same system, though they may be connected via a local network connection.

If the request parameters of the received search request reference an external data collection, which is not accessible to the indexers 206 or under the management of the data intake and query system 108, then the search head 210 can access the external data collection through an External Result Provider (ERP) process 810. An external data collection may be referred to as a "virtual index" (plural, "virtual indices"). An ERP process 810, 812 provides an interface through which the search head 210 may access virtual indices.

Thus, a search reference to an index of the system relates to a locally stored and managed data collection. In contrast, a search reference to a virtual index relates to an externally stored and managed data collection, which the search head 210 may access through one or more ERP processes 810, 812. FIG. 8 shows two ERP processes 810, 812 that connect to respective remote (external) virtual indices, which are indicated as a Hadoop or another system 814 (e.g., Amazon S3, Amazon EMR, other Hadoop Compatible File Systems (HCFS), etc.) and a relational database management system (RDBMS) 816. Other virtual indices may include other file organizations and protocols, such as Structured Query Language (SQL) and the like. The ellipses between the ERP processes 810, 812 indicate optional additional ERP processes 810, 812 of the data intake and query system 108. An ERP process 810, 812 may be a computer process that is initiated or spawned by the search head 210 and is executed by the search data intake and query system 108. Alternatively, or additionally, an ERP process 810, 812 may be a process spawned by the search head 210 on the same or different host system as the search head 210 resides.

The search head 210 may spawn a single ERP process 810, 812 in response to multiple virtual indices referenced in a search request, or the search head 210 may spawn different ERP processes 810, 812 for different virtual indices. Generally, virtual indices that share common data configurations or protocols may share ERP processes 810, 812. For example, all search query references to a Hadoop file system 814 may be processed by the same ERP process 810, 812, if the ERP process 810, 812 is suitably configured. Likewise, all search query references to an SQL database may be processed by the same ERP process 810, 812. In addition, the search head 210 may provide a common ERP process 810, 812 for common external data source 202 types (e.g., a common vendor may utilize a common ERP process 810, 812, even if the vendor includes different data storage system types, such as Hadoop 814 and SQL). Common indexing schemes also may be handled by common ERP processes 810, 812, such as flat text files or Weblog files.

The search head 210 determines the number of ERP processes 810, 812 to be initiated via the use of configuration parameters that are included in a search request message. Generally, there is a one-to-many relationship between an external results provider "family" and ERP processes 810, 812. There is also a one-to-many relationship between an ERP process 810, 812 and corresponding virtual indices that are referred to in a search request. For example, using RDBMS 816, assume two independent instances of such a system by one vendor, such as one RDBMS 816 for production and another RDBMS 816 used for development. In such a situation, it is likely preferable (but optional) to use two ERP processes 810, 812 to maintain the independent operation as between production and development data. Both of the ERPs, however, will belong to the same family, because the two RDBMS 816 system types are from the same vendor.

The ERP processes 810, 812 receive a search request from the search head 210. The search head 210 may optimize the received search request for execution at the respective external virtual index. Alternatively, the ERP process 810, 812 may receive a search request as a result of analysis performed by the search head 210 or by a different system process. The ERP processes 810, 812 can communicate with the search head 210 via conventional input/output routines (e.g., standard in/standard out, etc.). In this way, the ERP process 810, 812 receives the search request from a client device 804 such that the search request may be efficiently executed at the corresponding external virtual index.

The ERP processes 810, 812 may be implemented as a process of the data intake and query system 108. Each ERP Process 810, 812 may be provided by the data intake and query system 108, or may be provided by process or application providers who are independent of the data intake and query system 108. Each respective ERP Process 810, 812 may include an interface application installed at a computer of the external result provider that ensures proper communication between the search support system and the external result provider. The ERP processes 810, 812 generate appropriate search requests in the protocol and syntax of the respective virtual indices 814, 816, each of which corresponds to the search request received by the search head 210. Upon receiving search results from their corresponding virtual indices, the respective ERP process 810, 812 passes the result to the search head 210, which may return or display the results or a processed set of results based on the returned results to the respective client device 804.

Client devices 804 may communicate with the data intake and query system 108 through a network interface 820, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.12.1. ERP Process Features

The ERP processes 810, 812 described above may include two operation modes: a streaming mode and a reporting mode. The ERP processes 810, 812 can operate in streaming mode only, in reporting mode only, or in both modes simultaneously. Operating in both modes simultaneously is referred to as mixed mode operation. In a mixed mode operation, the ERP at some point can stop providing the search head 210 with streaming results and only provide reporting results thereafter, or the search head 210 at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head 210, which in turn provides results to the requesting client device 804. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source 202) are provided to the search head 210, which can then process the results data (e.g., break the raw data into events, timestamp it, filter it, etc.) and integrate the results data with the results data from other external data sources 202, and/or from data stores 208 of the search head 210. The search head 210 performs such processing and can immediately start returning interim (streaming mode) results to the user at the requesting client device 804; simultaneously, the search head 210 is waiting for the ERP process 810, 812 to process the data it is retrieving from the external data source 202 as a result of the concurrently executing reporting mode.

In some instances, the ERP process 810, 812 initially operates in a mixed mode, such that the streaming mode operates to enable the ERP quickly to return interim results (e.g., some of the raw or unprocessed data necessary to respond to a search request) to the search head 210, enabling the search head 210 to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head 210, the ERP may halt processing in the mixed mode at that time (or some later time) by stopping the return of data in streaming mode to the search head 210 and switching to reporting mode only. The ERP at this point starts sending interim results in reporting mode to the search head 210, which in turn may then present this processed data responsive to the search request to the client or search requester. Typically, the search head 210 switches from using results from the ERP's streaming mode of operation to results from the ERP's reporting mode of operation when the higher bandwidth results from the reporting mode outstrip the amount of data processed by the search head 210 in the streaming mode of ERP operation.

A reporting mode may have a higher bandwidth because the ERP does not have to spend time transferring data to the search head 210 for processing all the raw data. In addition, the ERP may optionally direct another processor to do the processing.

The streaming mode of operation does not need to be stopped to gain the higher bandwidth benefits of a reporting mode; the search head 210 could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's 210 switch from using streaming mode results to using reporting mode results may be appreciated by one skilled in the art.

The reporting mode can involve the ERP process 810, 812 (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head 210 understands the query language used in the received query request, which may be a proprietary language. One exemplary query language is Splunk Processing Language (SPL) developed by the assignee of the application, Splunk Inc. The search head 210 typically understands how to use that language to obtain data from the indexers 206, which store data in a format used by the SPLUNK® Enterprise system.

The ERP processes 810, 812 support the search head 210, as the search head 210 is not ordinarily configured to understand the format in which data is stored in external data sources 202 such as Hadoop 814 or SQL data systems. Rather, the ERP process 810, 812 performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process 810, 812 can operate in the streaming mode alone. After the ERP process 810, 812 has performed the translation of the query request and received raw results from the streaming mode, the search head 210 can integrate the returned data with any data obtained from local data sources 202 (e.g., native to the search support system), other external data sources 202, and other ERP processes 810, 812 (if such operations were required to satisfy the terms of the search query). An advantage of mixed mode operation is that, in addition to streaming mode, the ERP process 810, 812 is also executing concurrently in reporting mode. Thus, the ERP process 810, 812 (rather than the search head 210) is processing query results (e.g., performing event breaking, timestamping, filtering, possibly calculating statistics if required to be responsive to the search query request, etc.). It should be apparent to those skilled in the art that additional time is needed for the ERP process 810, 812 to perform the processing in such a configuration. Therefore, the streaming mode will allow the search head 210 to start returning interim results to the user at the client device 804 before the ERP process 810, 812 can complete sufficient processing to start returning any search results. The switchover between streaming and reporting mode happens when the ERP process 810, 812 determines that the switchover is appropriate, such as when the ERP process 810, 812 determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process 810, 812 does begin returning report results, it returns more processed results than in the streaming mode, because, e.g., statistics only need to be calculated to be responsive to the search request. That is, the ERP process 810, 812 doesn't have to take time to first return raw data to the search head 210. As noted, the ERP process 810, 812 could be configured to operate in streaming mode alone and return just the raw data for the search head 210 to process in a way that is responsive to the search request. Alternatively, the ERP process 810, 812 can be configured to operate in the reporting mode only. Also, the ERP process 810, 812 can be configured to operate in streaming mode and reporting mode concurrently, as described, with the ERP process 810, 812 stopping the transmission of streaming results to the search head 210 when the concurrently running reporting mode has caught up and started providing results. The reporting mode does not require the processing of all raw data that is responsive to the search query request before the ERP process 810, 812 starts returning results; rather, the reporting mode usually performs processing of chunks of events and returns the processing results to the search head 210 for each chunk.

For example, an ERP process 810, 812 can be configured to merely return the contents of a search result file verbatim, with little or no processing of results. That way, the search head 210 performs all processing (such as parsing byte streams into events, filtering, etc.). The ERP process 810, 812 can be configured to perform additional intelligence, such as analyzing the search request and handling all the computation that a native search indexer 206 process would otherwise perform. In this way, the configured ERP process 810, 812 provides greater flexibility in features while operating according to desired preferences, such as response latency and resource requirements.

2.12. It Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators (KPI's).

One or more Key Performance Indicators are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a graphic user interface (GUI), for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0. Call Center Metrics

Figure 9:
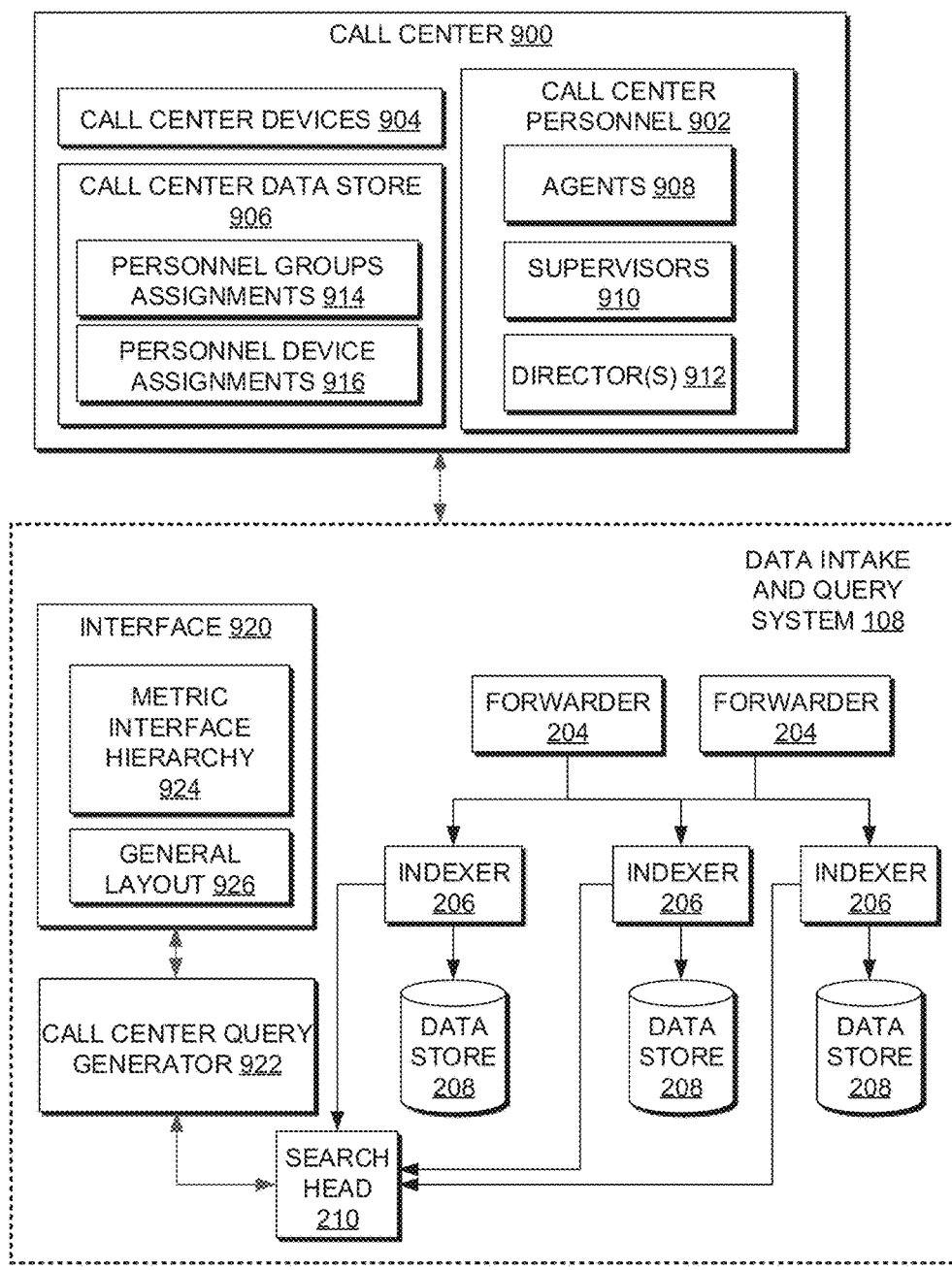
FIG. 9 illustrates a block diagram of a system in accordance with disclosed embodiments.

The system described above may be used to perform an analysis on a call center. FIG. 9 illustrates a block diagram of a system in accordance with disclosed embodiments. As shown in FIG. 9, a call center 900 is communicatively coupled to a data intake and query system 108. The call center 900 may be part of the data intake and query system 108 or may be separate from the data intake and query system 108. The call center 900 may include call center personnel 902, call center devices 904, and a call center data store 906.

The call center personnel 902 are the individuals in the call center that interact with customers or manage the call center. For example, the call center personnel may be employees, contract workers, or other individuals associated with the call center. The call center personnel 902 have various roles, including agents 908, supervisors 910, and director(s) 912. Agents 908 may provide a first level of interaction with customers. In other words, agents 908 receive initial communication from customers. The metrics to evaluate agents 908 may include number of communication sessions processed, length of time per communication session, number of additional products sold by the agents, average statisfaction rating of customers, other metrics, or a combination thereof. Supervisors 910 supervise the agents 908. Supervisors 910 may provide a second level of contact to the agents. Metrics to evaluate supervisors 910 may be customer rating, feedback of agents, number of escalated problems of customers successfully processed, other metrics, or a combination thereof. The director(s) 912 manage the end to end environment of the call center 900. The director(s) 912 may perform decision making for the remainder of the call center 900.

The call center 900 includes call center devices 904. The call center devices 904 are the various electronic equipment that connect call center personnel 902 to customers. The call center devices 904 includes phones, computing systems, contact manager servers executing contact management software, servers executing automated response and group routing to particular groups of agents, device routers for routing communications belonging to a communication session between devices, gateway device(s), and other such devices. Each call center device 904 may include monitoring and reporting capability. In other words, the call center devices 904 may include functionality to capture raw machine data. The raw machine data may be logs of connections to and from the device, the routing of the device, and other information. The call center devices may be configured to send the raw machine data directly or indirectly to the data intake and query system 108. The call center devices 904 may be a data source 202 described above with reference to FIG. 1 and the data intake and query system 108 may be configured to process the raw machine data as described above in response to a query. By way of another example, the call center devices 904 may be configured to transmit the raw machine data to an intermediate data store 906, such as data store 906. The intermediate data store 906 may be configured to process the raw machine data and generate processed data. The processed data may be in the form of records in a relational database. The records may be transmitted to the data intake and query system 108 described below.

The call center devices 904 may be communicatively connected to a call center data store 906. The call center data store 906 is any storage unit, device, or collection of devices for storing call center data. In particular, the call center data store 906 may store personnel group assignments 914 and personnel device assignments 916. Personnel group assignments 914 define relationships between call center personnel 902 and the groups to which the personnel are assigned. A group is assigned a set of support tasks. The, support task represent the type of problems and questions that are routed to the group. Personnel in the same group are redundant endpoints to the call center. Namely, any communication to a member (e.g., agent) of the group may be handled by any member of the group. By way of a more specific example, one group may be assigned the support task of managing billing questions, another group may be assigned the support task of handling connection requests, another group may be assigned a support task of handling service outages, etc. The personnel group assignments 914 may relate an agent/supervisor identifier to a group identifier. The agent/supervisor identifier is any unique identifier of the agent or supervisor (e.g., employee identifier, social security number, driver's license number, or other identifier). The group identifier is any unique identifier of the group.

The personnel device assignments 916 relate the personnel to the devices used by the personnel. For example, the personnel device assignments 916 may include the media access control (MAC) address, Internet Protocol (IP) address, or other unique identifier of the call center device used by an agent and/or supervisor as well as the unique identifier of the agent and/or supervisor.

As discussed above, the call center 900 is communicatively connected to the data intake and query system 108. For example, the call center 900 may be a part of the data intake and query system 108, directly connected to the data intake and query system 108, connected via a network to the data intake and query system 108 or otherwise connected such that communications may be transmitted between the call center 900 and the data intake and query system 108. The data intake and query system 108 may correspond to the data intake and query system 108 discussed above with reference to FIG. 1.

The data intake and query system 108 may include functionality to determine interaction metrics for a call center. In general, an interaction metric is a measurement describing interactions between the personnel of a call center and the customers. For example, the interaction metrics may be service level, total number of calls, total number of calls handled within a time frame, number of agents, efficiency of agents, utilization of agents, optimal number of agents, number of contacts made by agents, number of calls escalated to a supervisor, average handle time, number of calls closing an issue of a customer or resulting in a sale to a customer, or other metric. By way of another set of examples, the interaction metric may be a statistic (e.g., average, variance, median, etc.) about the service level, total number of calls, total number of calls handled within a time frame, number of agents, efficiency of agents, utilization of agents, optimal number of agents, number of contacts made by agents, number of calls escalated to a supervisor, number of calls closing an issue of a customer or resulting in a sale to a customer, or other metric. The service level is the percentage of calls answered within a predefined amount of time. The efficiency of the agents may be based on the speed at which agents process the calls to completion. The utilization of the agents is the percentage of time call center agents are on calls or in after-call work (e.g., reporting on the call). The optimal number of agents is the number of agents that are estimated to achieve at least one predefined threshold of another metric or metrics. In one or more embodiments, the optimal number is defined such that the predefined threshold is just achieved and additional agents cause the metric to exceed the threshold more than the optimal number, do not cause any change in the metric or cause the metric to be below the threshold.

In one or more embodiments, interaction metrics are defined on a call center basis and a per group basis. For example, an interaction metric may be generated for an entire call center. By way of another example, an interaction metric may be generated individually for one or more groups of the call center. For example, each group of the call center may have an individual interaction metric that is defined for the group. The individual interaction metric may be independent on other groups or dependent on other groups. For example, the optimal number of agents may assume that unlimited number of agents are assigned to the call center. In the example, the determining of the optimal number of agents for a group is independent on the optimal number of agents assigned to other groups. By way of another example, the optimal number of agents may account for the total number of agents available to the call center. In such a scenario, the optimal number of agents for a group is dependent on the number of agents for other groups and total number of agents available.

In one or more embodiments, interaction metrics may be past interaction metrics, current interaction metrics and future interaction metrics. Past interaction metrics are interaction metrics defined for a time period before the current time period. Current interaction metrics are defined for the current time period. Future interaction metrics are interaction metrics defined for after the current time period. In some embodiments, the current time period is based on real-time reporting and monitoring of interaction metrics. For example, the current time period may be the current hour, the current ten-minute interval, the current set of three hours, etc. Current interaction metrics may be based on current interaction data. Current interaction data is data collected from the call center devices 904 within the current time period.

The data intake and query system 108 implementing call center analysis may include an interface 920, a call center query generator 922, a search head 210, one or more indexers 206, one or more data stores 208, and one or more forwarders 204. The search head 210, one or more indexers 206, one or more data stores 208, and one or more forwarders 204 may be the same or similar to the corresponding components of FIG. 2. In particular, the forwarders 204 may include functionality to receive processed data from the call center 900. The forwarders 204 may include functionality to forward the processed data to the data stores 208 via the indexers 206. Further, the forwarders 204 may include functionality to receive raw machine data directly or indirectly from the call center devices 906. The forwarders 204 may include functionality to forward the raw machine data to the data stores 208 via the indexers 206. The data stores 208 may store the raw machine data as raw machine data for processing when a request for an interaction metric is received.

The search head 210 in FIG. 9 may be the same or similar to the search head 210 discussed above with reference to FIG. 2. The search head 210 in FIG. 9 implementing the call center analysis may include the functionality and the components of the search head discussed below with reference to FIG. 10. The search head 210 includes functionality to execute a query and generate an interaction metric.

The interface 920 is the instructions for an application programming interface or graphical user interface that includes functionality to directly or indirectly interact with a user. For example, the interface 920 may be an interface of the reporting application described above. By way of another example, the interface 920 may be a report generation interface. The interface 920 may execute on a computing device, such as a server implementing a front end of a web application. The interface includes functionality to receive a request for one or more interaction metrics, trigger generating the one or more interaction metrics, and providing, directly or indirectly, the one or more interaction metrics to a user.

In one or more embodiments, the interface includes a metric interface hierarchy 924 and a general layout 926. The metric interface hierarchy 924 is hierarchy having nodes ordered in parent child relationships. Each node includes a visualization for the node. The visualization defines a presentation for the node. For example, the visualization may include a definition of colors, a definition of a graph, a definition of charts, the current interaction metric presented by the node, or other visualization. Each node may further include a unique identifier for the node. Child nodes are dependent on the corresponding parent node. A root node is at a top level and independent of other nodes in the hierarchy, while a leaf node is dependent on multiple nodes of the metric interface hierarchy. The ordering in the metric interface hierarchy 924 may be based on an ordering of interaction metrics represented by each node. In other words, the more general interaction metrics may correspond to parent nodes of the metric interface hierarchy 924 while the more specific interaction metrics are child nodes of the metric interface hierarchy 924. By way of an example, an interaction metric that is a single value defined for the entire call center 900 may be a parent node of child node for multiple interaction metrics of the same type defined for the call center over time and a parent node of child node having multiple interaction metrics an interaction metrics for multiple groups. The ordering of the nodes may be defined in the metric interface hierarchy 924 separately from the visualization of the nodes. For example, the ordering may be defined using the unique identifier of the nodes. In one or more embodiments, the metric interface hierarchy 924 is defined using JAVASCRIPT® Object Notation (JSON).

The general layout 926 is a template specifying locations of visualizations on a graphical user interface. Locations in the general layout 926 are ordered according to the parent child relationships. In one or more embodiments, the general layout 926 is partitioned into tiers. The tiers that are disposed above other tiers in the general layout 926 are for parent nodes, while the tiers that are disposed below another tier is for child nodes. An example of a general layout 926 is presented below in reference to FIG. 18. The graphical user interface is discussed in further detail in Section 4.0.

Continuing with FIG. 9, the call center query generator 922 is hardware, software, firmware or a combination thereof that includes functionality to generate a query to obtain an interaction metric. In one or more embodiments, the call center query generator 922 may be triggered by the interface 920 to generate one or more queries. The query may have an ordered set of pipeline commands, whereby each pipeline command may specify data to obtain or generate that is used for the next pipeline command. Each pipeline command may correspond to a phase of the query (i.e., query phase) discussed above with reference to FIG. 6. The result of executing the query may be the interaction metric. For example, the call center query generator 922 may be configured to generate, separately for each group, a query to determine a current interaction metric for the group. By way of another example, the call center query generator 922 may be configured to determine an optimal number of agents 908 based on the submission of multiple queries to the search head 210. The call center query generator 922 may be configured to aggregate results across multiple queries.

Figure 10:
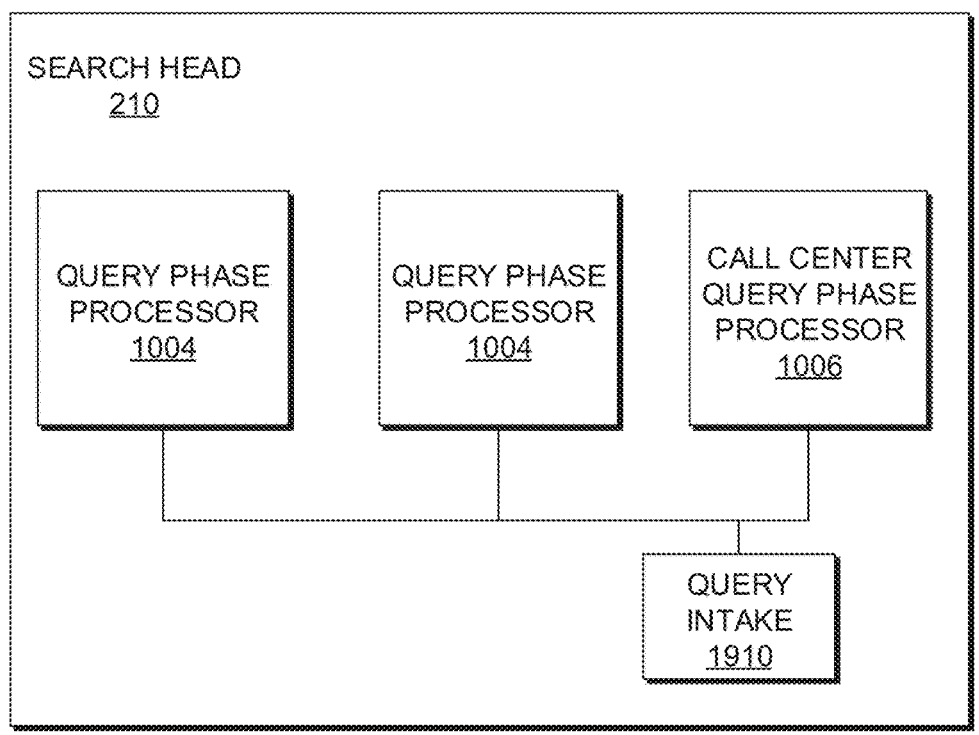
FIG. 10 illustrates a block diagram of a search head in accordance with disclosed embodiments.

As discussed above, queries are submitted to a search head 210. FIG. 10 illustrates a block diagram of a search head 210 in accordance with disclosed embodiments. As shown in FIG. 10, the search head 210 includes a query intake 1910 and query phase processors 1004, 1006. A query phase processor 1004, 1006 may be hardware, software, firmware, or any combination thereof. The query phase processor 1004, 1006 includes instructions for executing a query phase when provided with the parameters of the query phase. In one or more embodiments, each query phase processor 1004 is specific to the type of query phase. In other words, the query phase processor 1004, 1006 has a one to one correspondence with possible query phases that may be in the query. The query phase processor 1004, 1006 is configured to receive a request to execute a pipeline command, where the request includes parameters, and execute the instructions of the query phase processor 1004, 1006 using the parameters. The query phase processor 1004 further includes functionality to return results from executing a query phase. The query phase processor 1004, 1006 may be predefined by the system and distributed with the search head 210, created by an information technology specialist, created by a software developer after the search head 210 is distributed (e.g., as a plug in to the search head 210), or by another. Further, although only three query phase processors 1004, 1006 are shown, more query phase processors 1004, 1006 may exist without departing from the scope of the invention. By way of a more specific example, a query phase processor 1004 may include a search query phase processor that executes a search pipeline command to search the data stores 208 and obtain events. In one or more embodiments, the search phase processor may include functionality to invoke the indexers 206 and manage the search to obtain results. The results may be a portion of raw machine data that is associated with a timestamp. A query phase processor 1004 may be an aggregation phase processor. The aggregation phase processor 1004 may include functionality to execute an evaluation pipeline command. The evaluation pipeline command is a request to aggregate data to obtain processed data. For example, if the raw machine data includes connection and disconnection requests to a call center device 904 of a call center agent 908, the aggregation may be the duration of time in which the call center agent 908 is connected. A query phase processor 1004 may be a statistics phase processor. The statistics phase processor includes functionality to execute a statistics pipeline command. A statistics pipeline command is a request to obtain a statistic about data.

In one or more embodiments, at least one of the query phase processors may be a call center query phase processor 1006. The call center query phase processor 1006 includes functionality to generate an interaction metric for a call center 900. In one or more embodiments, the call center query phase processor 1006 implements ErlangC formula. ErlangC formula calculates a probability that a new customer will be added to a wait queue as opposed to immediately connected to an agent. The call center query phase processor 1006 may implement the original version of the ErlangC formula or may implement a modified version of the ErlangC formula. The modified version may be to replace the factorial calculations in the ErlangC formula with Ramanujan factorial approximation. Further, the modified version of ErlangC may change the probability of a customer waiting to a probability of a customer not waiting. The probability of a customer not waiting may be the sum of a exponential function approximation and an error portion. The error portion may be a summation. Further optimization may be performed by truncating the summation of the error portion.

The above is an example of a call center query phase processor 1006. Other example call center query phase processors 1006 may exist that are configured to generate other interaction metrics. Further, although only three query phase processors 1004 are shown, other query phase processors 1004 may exist without departing from the scope of the invention.

Figure 11:
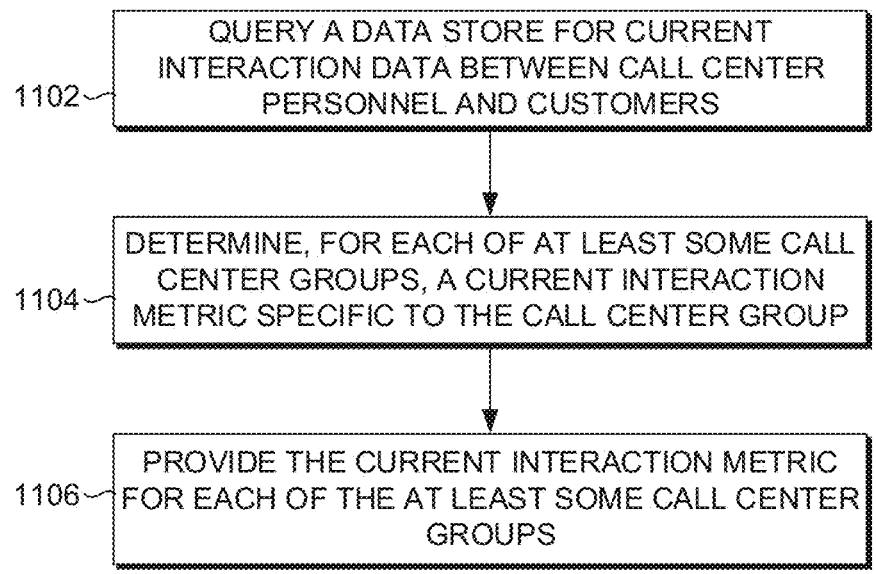
FIG. 11 is a flow diagram illustrating how an interaction metric may be determined in accordance with disclosed embodiments.

FIG. 11 is a flow diagram illustrating how an interaction metric may be determined in accordance with disclosed embodiments. In Block 1102, a data store is queried for current interaction data between call center personnel and customers. In particular, a query is sent to the data store for current interaction data. The query may be sent according to a structured data base query (e.g., using structure query language (SQL)) in the case of the interaction data being processed data. By way of another example, the query may be in accordance with a raw machine data search command. The data returned form the query includes current interaction data, such as real time data obtained during a current time period. The current interaction data may be partitioned into groups. Each group may have corresponding current interaction data. The partitioning may be performed by sending separate queries to the data store. By way of another example, the partitioning may be performed by the remainder of the data intake and query system and/or the data store.

Different techniques may be used to determine which current interaction data relates to which group. In at least some embodiments, current interaction data, such as each event in raw machine data, directly include an agent identifier. By relating the agent identifier to the group to which the agent is assigned, the group corresponding to the raw machine data may be identified. In some embodiments, the current interaction data includes a group identifier.

If the current interaction data only includes information about the physical or virtual device to which a communication is directed, partitioning the current interaction data into groups may be based on a combining information about personnel groups assignments and personnel device assignments to identify group device assignments. In other embodiments, the data stores may directly store group device assignments. The group device assignments identify a set of call center devices that are assigned to each group. Some call center devices are used for multiple groups, such as to route communications to various groups. Thus, the current interaction data for a group may be obtained by querying the data store for current interaction data from the set of call center devices assigned to a group and current interaction data describing communications to and from the set of call center devices assigned to a group. By obtaining current interaction data on a per group basis or by having the current interaction data identify the groups, resulting current interaction metrics may be obtained on a per group basis. Rather than the current interaction data being partitioned on a per group basis when obtained from the data store, the current interaction data may be partitioned by devices. Subsequently, the current interaction data may be partitioned into groups based on the group device assignments.

In Block 1104, for each of at least some of the call center groups, a current interaction metric that is specific to the call center group is determined. The current interaction metric is determined from the current interaction data. For example, an ErlangC function may be applied to determine the current interaction metric. The ErlangC function identifies the probability of a customer waiting in a queue as opposed to being immediately connected to call center personnel. Based on the probability, various interation metrics may be determined, such as the service level per group. By obtaining interaction metrics on a per group basis, one or more embodiments are able to identify how each group compares across the call center. Directors and others may use the information to make staffing decisions across the call center. For example, rather than adding agents to equally or based on guesses to various groups, the director and supervisors may add agents based on the needs of each group. Further, the director and supervisors may move agents on an as needed basis. Additionally, by using current interaction data, immediate changes to the personnel assignments may be performed.

Continuing with FIG. 11, in Block 1106, the current interaction metric is provided for each of the at least some call center groups. Providing the current interaction metric may include generating a graphical user interface as described below with the current interaction metric. The graphical user interface may be transmitted as instructions to the user's computing device. Providing the current interaction metric may include displaying the current interaction metric. Providing the current interaction metric may include transmitting the current interaction metric via an application programming interface. By way of another example, providing the current interaction metric may be to transmit an alert, such as a message, to the user when the current interaction metric fails to satisfy a criteria.

Figure 12:
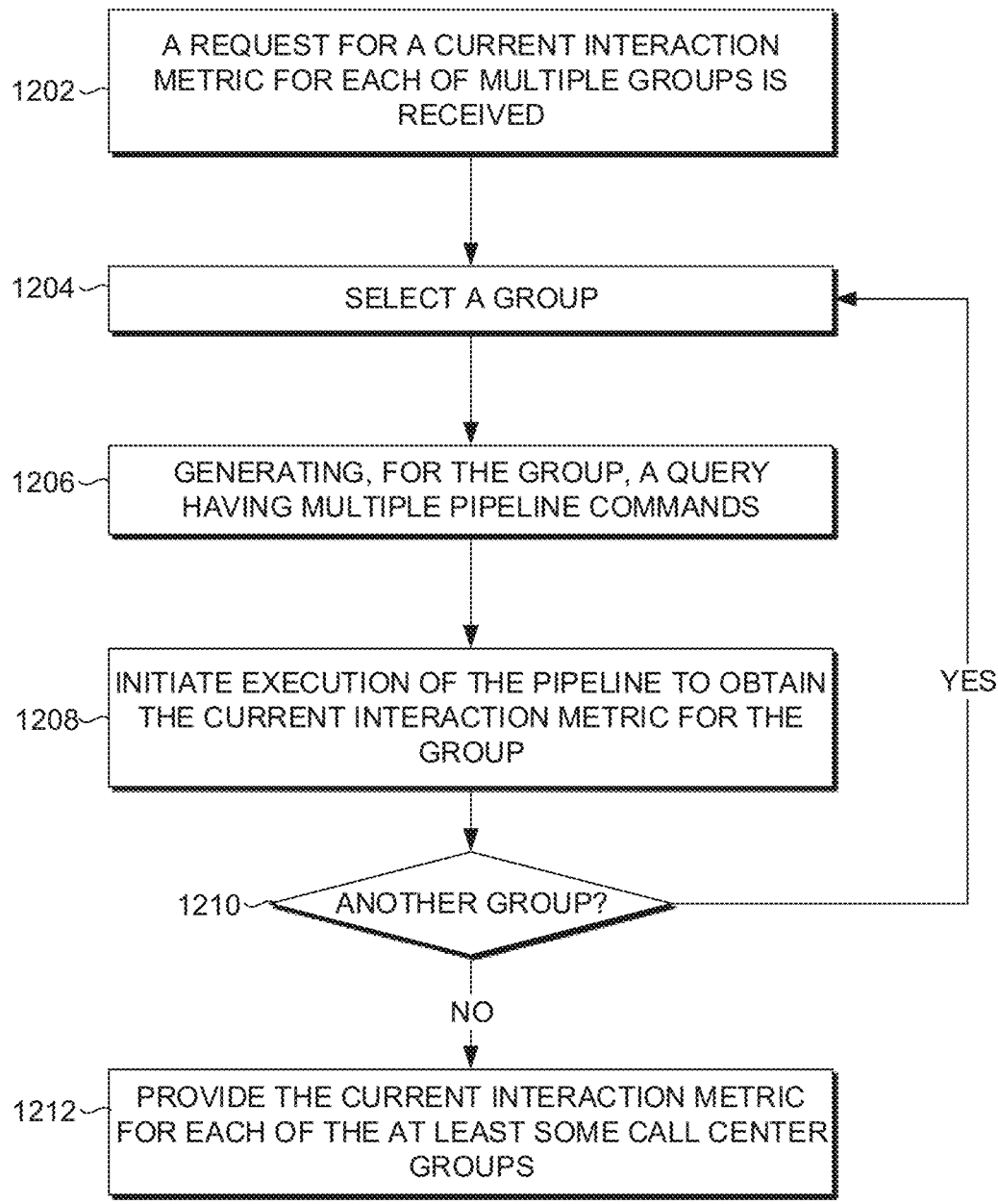
FIG. 12 is a flow diagram illustrating how to determine a current interaction metric on a per group basis in accordance with disclosed embodiments.

FIG. 12 is a flow diagram illustrating how to determine a current interaction metric on a per group basis in accordance with disclosed embodiments. In Block 1202, a request for current interaction metric for each of multiple groups is received. For example, a request may be received to display a graphical user interface. For example, the request may be initiation of a website, a selection of a link in a website. The current interaction metric that is displayed may be a default interaction metric that is displayed upon initiation of the graphical user interface. As another example, the user may select a link to obtain a current interaction metric. The request may specify one, more than one, or all groups. For example, the request may include group identifiers.

In Block 1204, a group is selected. In one or more embodiments, the system processes each group in the request to obtain a current interaction metric for the group. The processing may be processing one or more groups concurrently and/or in serial.

In Block 1206, for the selected group, a query having multiple pipeline commands is generated. In one or more embodiments, the query includes multiple pipeline commands. The pipeline commands may include a data acquisition command to search the data store for current interaction data, a stats command to aggregate the current interaction data, an evaluation command to evaluate the statistics and generate evaluation results, and a call center command to generate the current interaction metric. Each command may have parameters. The parameters of the command may be predefined in a predefined query. The call center query generator may be configured to add the group identifier to the predefined query.

In Block 1208, execution of the pipeline is initiated to obtain a current interaction metric for the group. In one or more embodiments, the call center query generator sends the query to the search head. The search head receives and processes the query using the indexers and the command processors. After processing the query, the search head returns the results.

In Block 1210, a determination is made whether to repeat for another group. If a determination is made to repeat processing for another group, the flow proceeds to Block 1204 to select another group. As discussed above, each selected group is processed to obtain current interaction metrics for each selected group.

Before or after each of the multiple groups have current interaction metrics, Block 1212 may be performed. In Block 1212, the current interaction metric is provided for each of the at least some call center groups. Providing the current interaction metric for each of the at least some call center groups may be performed as discussed above with reference to Block 1106 of FIG. 11.

Figure 13:
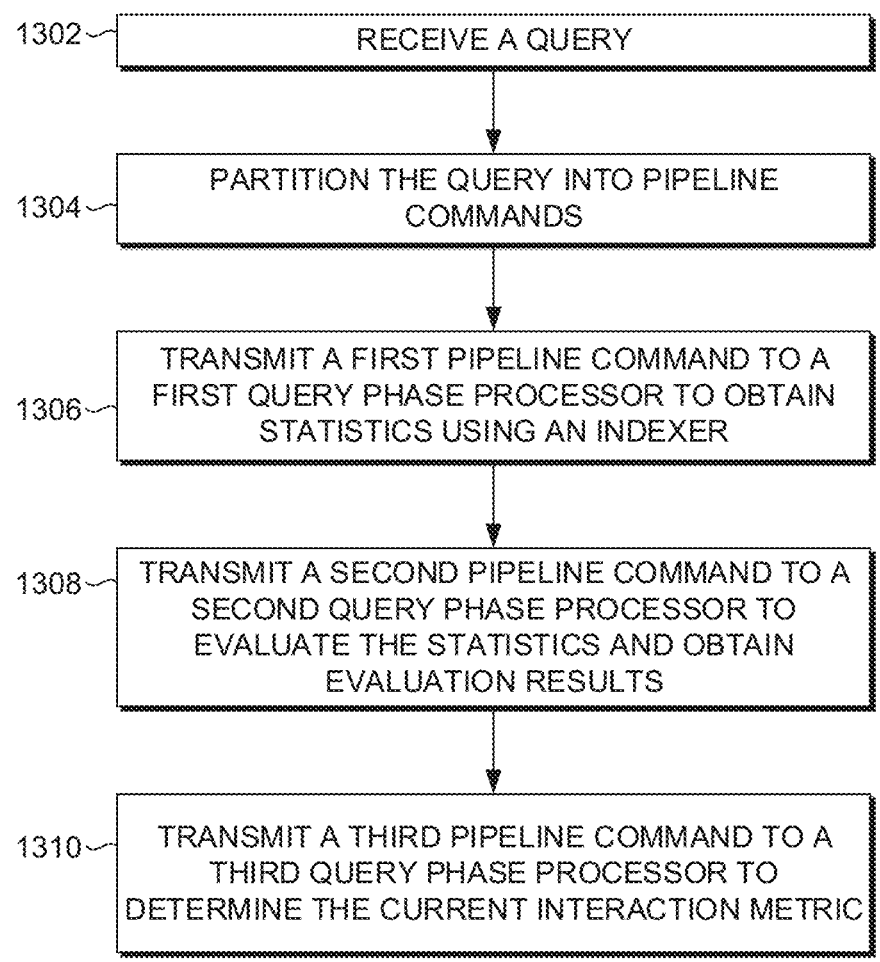
FIG. 13 is a flow diagram for processing a pipeline command to determine a current interaction metric in accordance with disclosed embodiments.

FIG. 13 is a flow diagram for processing a pipeline command to determine a current interaction metric in accordance with disclosed embodiments. In other words, FIG. 13 shows a flow diagram for processing by a search head in accordance with one or more embodiments.

In Block 1302, a query is received. The search head receives the query from the call center query generator.

In Block 1304, the query is partitioned into pipeline commands. In one or more embodiments, the search head partitions the query into pipeline commands by parsing the query into tokens. Each token corresponds to a command identifier, a parameter, or a delimiter. Predefined tokens, such as "|", may be used to denote the end of a previous pipeline command and the start of a new command.

In Block 1306, the first pipeline command is transmitted to a first query phase processor to obtain statistics using an indexer. The search head processes the command using the instructions of the first query phase processor. The first query phase processor uses the parameters of the command to process the command. Processing of the first command to perform data acquisition may be performed as discussed above to obtain raw machine data.

In Block 1308, the second pipeline command is transmitted to a second query phase processor to evaluate the statistics and obtain evaluation results. In particular, the data obtained from the first query phase processor is used as input to the second query phase processor with the parameters of the second pipeline command. The second query phase processor includes mathematical functions to perform statistics and obtain evaluation results.

In Block 1310, a third pipeline command is transmitted to a third query phase processor to determine the current interaction metric. In particular, the data obtained from the second query phase processor is used as input to the third query phase processor with the parameters of the third pipeline command. The third query phase processor includes instructions to obtain the particular current interaction metric. The search head then returns the current interaction metric to the call center query generator. The call center query generator may provide the current interaction metric to the user as discussed above.

Figure 14:
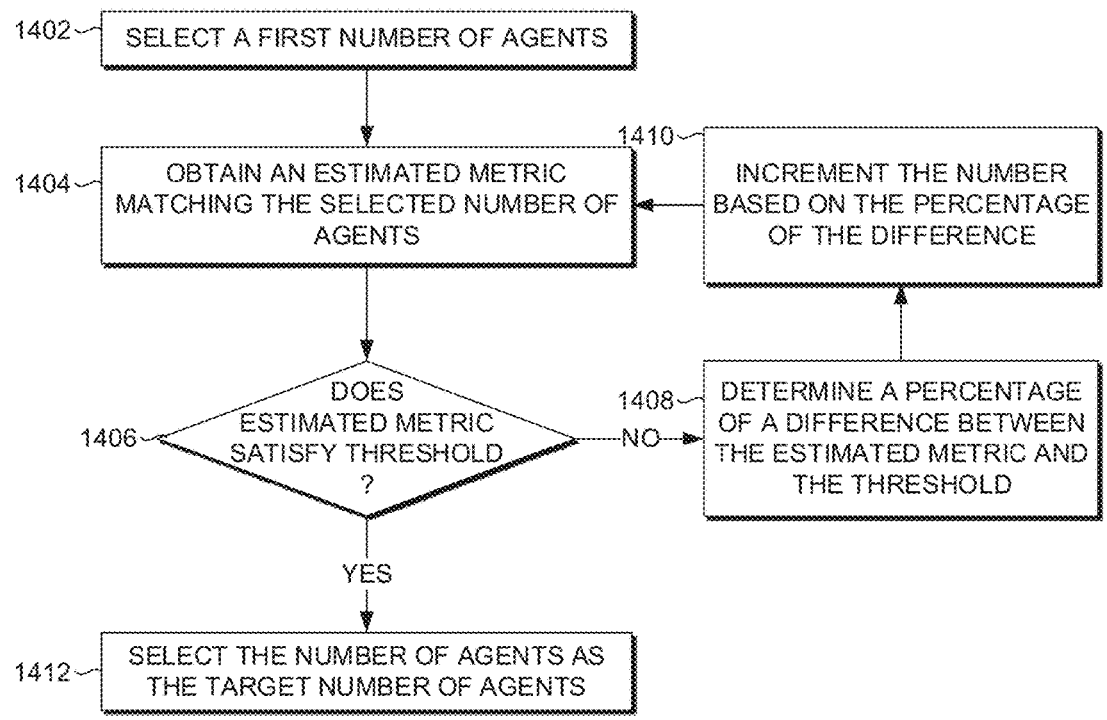
FIG. 14 is a flow diagram illustrating how to determine a number of agents in accordance with disclosed embodiments.

In some embodiments, the call center query generator uses the technique described in FIGS. 12 and 13 to determine a current interaction metric defining the optimal or a target number of agents. In other words, by repetitively sending all or part of a query with different numbers of agents, the call center query generator may determine the target number of agents. In at least some embodiments, the selection of the number of agents that is optimal is performed to reduce execution time on a computing device. FIG. 14 is a flow diagram illustrating how to determine a number of agents in accordance with disclosed embodiments. FIG. 14 may be performed on a per group basis.

In Block 1402, a first number of agents is selected. In one or more embodiments, the first number of agents is the current number of agents.

In Block 1404, an estimated metric matching the selected number of agents is obtained. The estimated metric is the interaction metric that is estimated based on the number of agents. Initially, using the first number of agents, the call center query generator generates a query as described above with reference to FIG. 12. The search head processes the query as described above with reference to FIG. 13 to obtain an interaction metric.

In Block 1406, a determination is made whether the estimated metric satisfies a threshold. In other words, the estimated metric is compared against the threshold. If the threshold is a lower bound threshold, then the estimated metric satisfies the threshold when the estimated metric is greater than or equal to the threshold. If the threshold is an upper bound threshold, then the estimated metric satisfies the threshold when the estimated metric is less than or equal to the threshold. By way of an example, if the threshold is 85% service level, and the current interaction metric is 70% service level, then the current interaction metric does not satisfy the threshold. In one or more embodiments, the threshold is predefined. For example, the threshold may be defined by a user of the call center, director of the call center, etc.

In Block 1408, if the estimated metric does not satisfy the threshold, then a percentage of the difference between the estimated metric and the threshold is determined. In one or more embodiments, the difference between the current interaction metric and the threshold is calculated. The percentage difference is the difference divided by the threshold multiplied by one hundred.

In Block 1410, the number of agents is incremented based on the percentage of the difference. The percentage difference determined in Block 1408 is multiplied by the number of agents to obtain an intermediate result. The intermediate result is added to the number of agents to obtain a new number of agents. By repetitively incrementing the number based on the percentage difference, the subsequent interaction metric is much closer to the threshold and less processing is performed. In other words, the optimal solution is achieved faster. In one or more embodiments, when the current interaction metric is within a predefined range of the threshold, rather than using the percentage difference, the number of agents may be incremented by a predefined amount (e.g., 1 or 2).

After obtaining a second number of agents, the process may repeat to obtain a current interaction metric for the second number of agents. With each subsequent iteration of the process of FIG. 14, the call center query generator may generate a new query. In one or more embodiments, subsequent queries use the current interaction data from the first query with the subsequent number of agents replacing the prior number of agents in the pipeline commands. In other words, the data acquisition pipeline command may be omitted in subsequent queries so that current interaction data is not reacquired from the data store.

In Block 1412, when the estimated metric for a number of agents satisfies the threshold in Block 1406, the number of agents is selected as the target number of agents. In one or more embodiments, the target number of agents is provided as the optimal number. Providing the target number of agents may be performed as discussed above with reference to FIG. 11.

Figure 15:
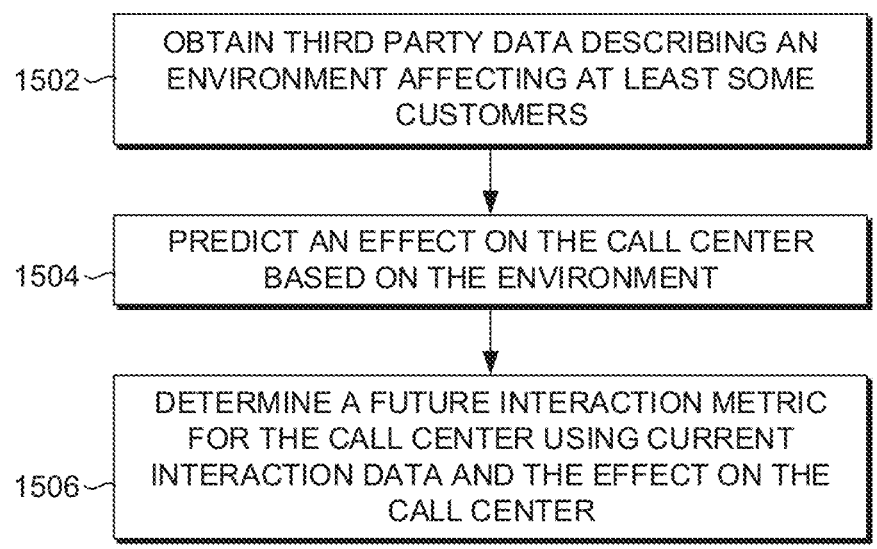
FIG. 15 is a flow diagram illustrating how to correlate third party data with call center information to determine a future interaction metric in accordance with disclosed embodiments.

The techniques described in FIGS. 11, 12, and 13 may be used to generate a future interaction metric by correlating current interaction data with third party data. FIG. 15 is a flow diagram illustrating how to correlate third party data with call center information to determine a future interaction metric in accordance with disclosed embodiments.

In Block 1502, third party data describing an environment affecting at least some customers is obtained. The environment may be weather in the region of the customers (e.g., storms, sunny, cloudy, etc.), promotional environment (e.g., sales promotions being offered by the business for which the call center is created, sales promotions by competitors), information technology environment (e.g., switching servers, data breach event affecting at least some customers, change in software applications or user interfaces) or other environment. Obtaining the third party data may be performed by sending a request to the third party using the application programming interface of the third party. By way of another example, obtaining third party data may be performed by data scaping a website of a third party.

In Block 1504, an effect on the call center is predicted based on the environment. The effect may be the predicted volume of calls to the call center, the amount of time to process each call, or other effect. Predicting the effect may be performed using machine learning. In other words, a set of training data based on historical events may be obtained. The historical events may include the environment and the call center interaction data at the time of the existence of the environment. Machine learning may be employed to determine which call center interaction data is affected by the environment and how the call center interaction data is effected by the environment. For example, stormy weather may result in more calls to a call center processing pizza orders. By way of another example, a change in user interfaces by a technology company may result in longer calls to the technology company so that users are able to learn the new user interface. The effect may be on a group basis. For example, a change in user interface may only affect a group that manages information technology problems. By way of another example, a change in promotional environment may affects sales for a particular product, information technology, and billing, but not a group that manages sales for other products. The degree of the effect (e.g., amount of increase or decrease in call volume, amount of the increase or decrease in length of time to handle a call) may be learned using machine learning.

In Block 1506, a future interaction metric is determined for the call center using the current interaction data and the effect on the call center. From the effect on the call center, the current interaction data is updated to match the effect. For example, if an increase in 100 calls is expected based on the environment, then the current interaction data obtained from the data store is updated to increase the call volume by 100. For example, the call center query generator may include a pipeline command to obtain current interaction data for the call center or a group thereof, and modify the current interaction data to match the effect. The call center query generator may further include pipeline commands as discussed above in FIGS. 12 and 13 to obtain future interaction metrics based on the modified current interaction data. The future interaction metric may be provided in a same or similar manner discussed above with reference to FIG. 11.

Figure 16:
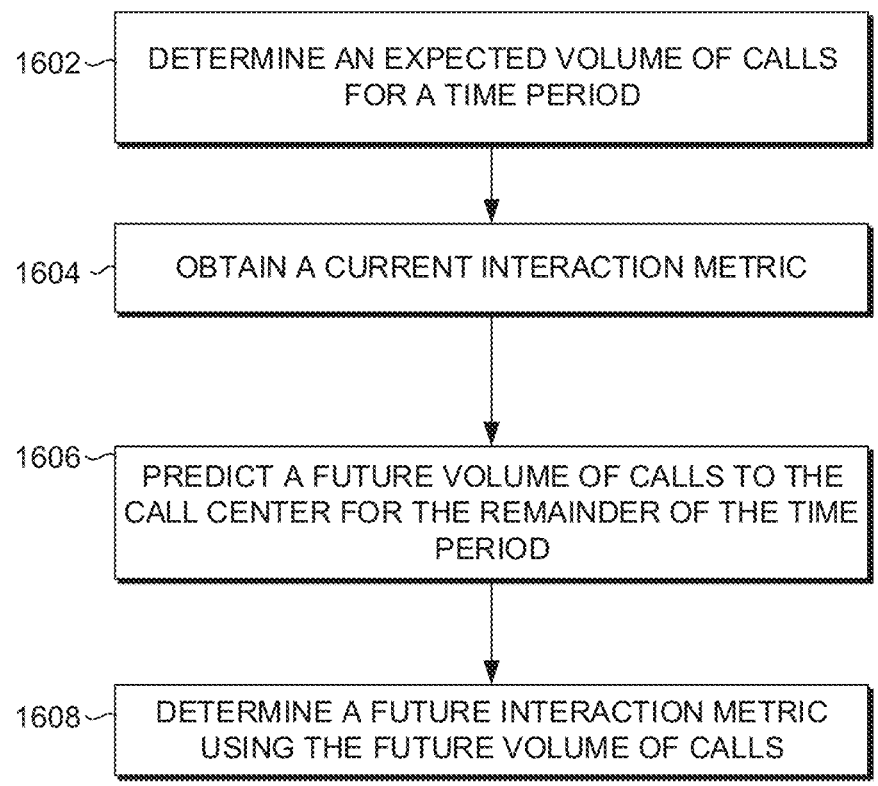
FIG. 16 is a flow diagram illustrating how to predict a future volume of calls in accordance with disclosed embodiments.

One or more embodiments may also use machine learning to predict a future volume of calls. FIG. 16 is a flow diagram illustrating how to predict a future volume of calls in accordance with disclosed embodiments. In Block 1602, an expected volume of calls is determined for a time period. The expected volume of calls may be determined based on the environment, historical trends based on the day of the year, or other information. The time period may be an expanded time period of the current time period. For example, the current time period may be the current four hours, and the expanded time period may be the day. By way of another example, the expanded time period may be the length of time that a promotion is operating.

In Block 1604, a current interaction metric is obtained. In one or more embodiments, the current interaction metric is obtained for the current time period. More particularly, the current interaction metric describes a performance of a call center within the time period to a current point in time.

In Block 1606, a future volume of calls to the call center 900 is predicted for the remainder of the time period. Machine learning may be applied based on the expected volume of calls and the current interaction metric to obtain a future volume of calls. The future volume of calls may be for the remainder of the time period (e.g., the remainder of the day).

In Block 1606, the future interaction metric is determined using the future volume of calls. From the future volume of calls and the current interaction metric the call center query generator may generate a query to obtain a future interaction metric. The future interaction metric may be provided as discussed above. Using the future interaction metric, the user may determine how to adjust personnel in the call center.

4.0. Graphical User Interface Generation

Figure 17:
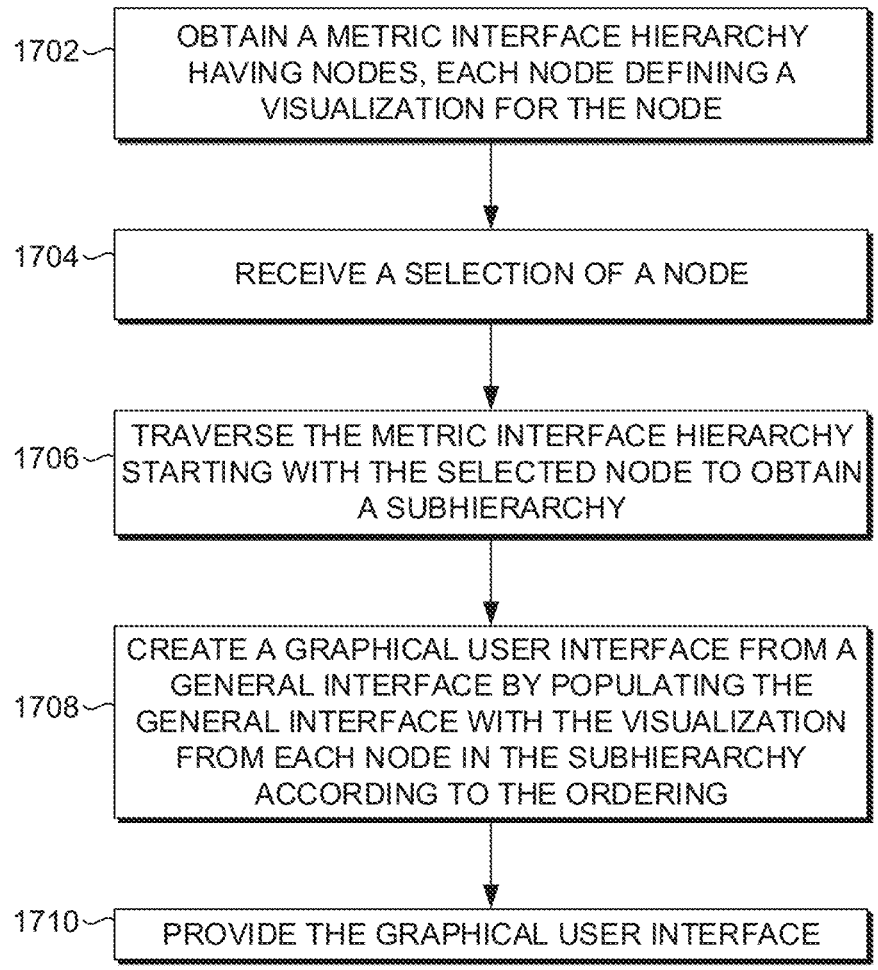
FIG. 17 is a flow diagram illustrating how to generate a graphical user interface in accordance with disclosed embodiments.

The various metrics may be presented in a graphical user interface using a metric interface hierarchy and a general interface. FIG. 17 is a flow diagram illustrating how to generate a graphical user interface in accordance with disclosed embodiments.

In Block 1702, a metric interface hierarchy having nodes is obtained, where each node defines a visualization for the node. For example, the metric interface hierarchy may be obtained from a data store.

In Block 1704, a selection of a node is received. In one or more embodiments, when the graphical user interface is initially displayed a default interaction metric is displayed. In such a scenario, the node corresponding to the default interaction metric is selected in Block 1704. By way of another example, a user may select a button or link in a currently displayed graphical user interface to select an interaction metric. In such a scenario, the node corresponding to the interaction metric is selected in Block 1704. In one or more embodiments, attributes, such as relationships between the nodes and the interaction metrics and default interaction metric, are defined in the metric interface hierarchy. Thus, identifying the node corresponding to the interaction metric may be determine directly from the metric interface hierarchy in accordance with one or more embodiments.

In Block 1706, the metric interface hierarchy is traversed starting with the selected node to obtain a subhierarchy. In other words, the nodes that are direct and indirect child nodes of the selected node are obtained from the metric interface hierarchy. The result is a subhierarchy having a root node of the selected node.

In Block 1708, a graphical user interface is created from a general interface by populating the general interface with the visualization from each node of the subhierarchy according to the ordering. The general interface includes placeholders for the visualization corresponding to the root node, the visualization corresponding to each child node, etc., to the visualizations corresponding to the leaf nodes of the hierarchy. The placeholders are populated according to the ordering on the nodes in the subhierarchy with the visualizations specified by the nodes. In particular, any graphs, charts, graphics or other visualizations are generated as specified in the nodes. The generated visualizations are placed into the graphical user interface in the position specified by the general interface based on the position or ordering of the nodes within the subhierarchy.

In Block 1710, the graphical user interface is provided in accordance with one or more embodiments of the invention. Providing the graphical user interface may be performed as discussed above with reference to FIG. 11.

Figure 18:
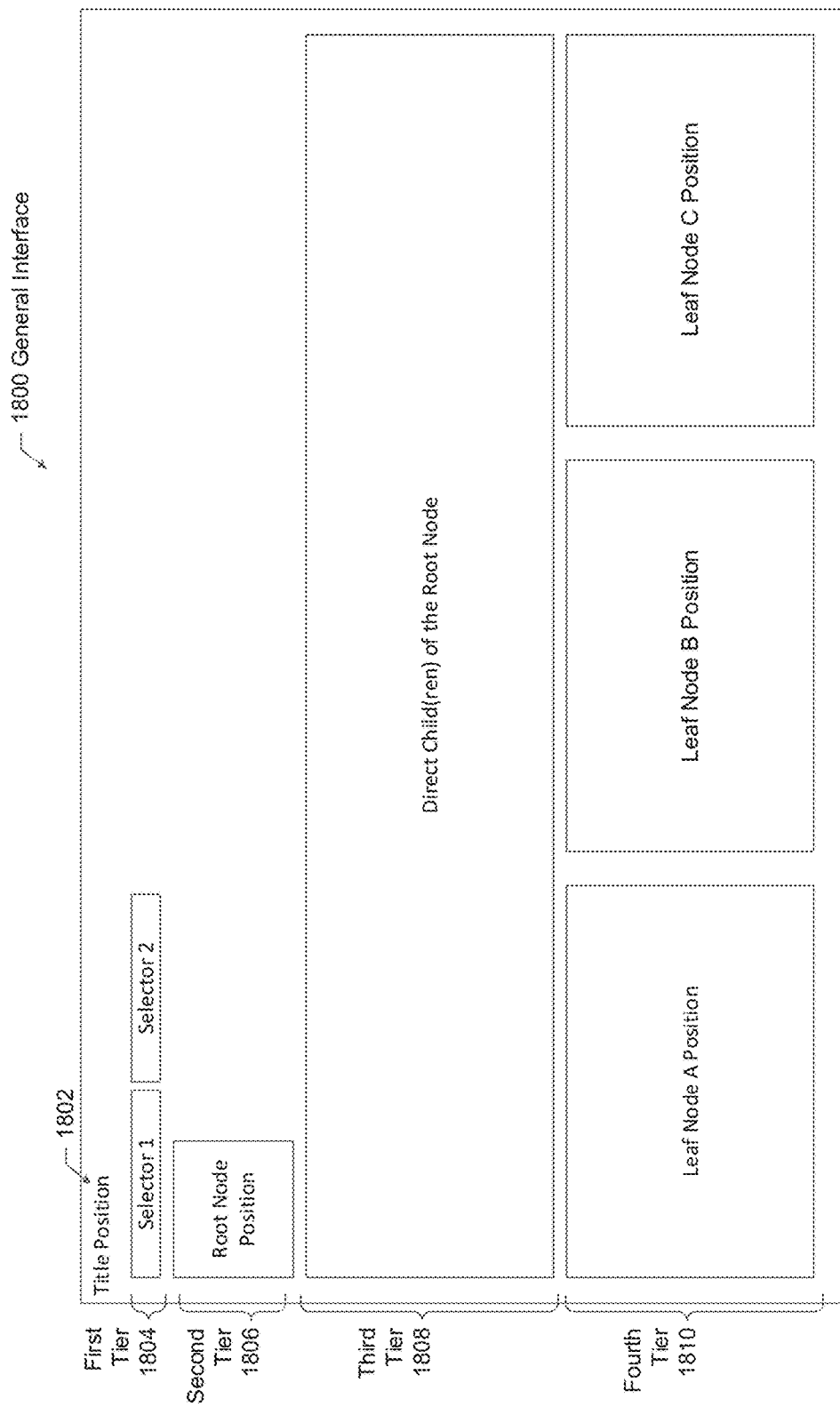
FIG. 18 is a diagram of a general interface in accordance with disclosed embodiments.

FIG. 18 is a diagram of a general interface 1800 in accordance with disclosed embodiments. As shown in the diagram, the general interface 1800 has a title position 1802, which is the location of the title. The general interface 1800 is further has multiple tiers 1804, 1806, 1808, 1810. The first tier 1804 has positions for selector buttons to select a filter. The second tier 1806 has a position for the root node of the subhierarchy and to select from multiple possible interaction metrics. In particular, each interaction metric that may be selected as a root node of the subhierarchy may be in the second tier 1806. The selected interaction metric is the root node of the subhierarchy. The visualization defined in the root node is presented in the second tier.

The third tier 1808 has the position(s) for the visualization(s) of direct child or children of the root node. As shown, the third tier 1808 is disposed below the second tier 1806. Although FIG. 18 shows a single position, the general interface 1800 may include instructions for dynamically setting the number of positions according to the number of child nodes in the tier. If multiple children nodes exist, then the visualization of the additional children nodes may be placed adjacent to each other, with or without automated resizing to accommodate the visualizations from the multiple nodes.

The fourth tier 1810 has the position(s) for the visualization of the leaf node(s) of the subhierarchy. As with the third tier 1808, although FIG. 18 shows three positions, the general interface 1800 may include instructions for dynamically setting the number of positions according to the number of leaf nodes (e.g., by placing the additional nodes adjacent to each other or automated resizing of the positions). The fourth tier 1810 is disposed underneath the third tier 1808. If multiple additional levels of the hierarchy exist (e.g., direct children of the direct children of the root node that are not leaf nodes), then the additional levels may be placed between the third tier 1808 and the fourth tier 1810. In other words, the fourth tier may not be disposed directly under the third tier 1808, but rather indirectly disposed under the third tier 1808. More specifically, the general interface 1800 may include instructions for dynamically adjusting the number of tiers according to the number of levels of the subhierarchy.

Figure 19:
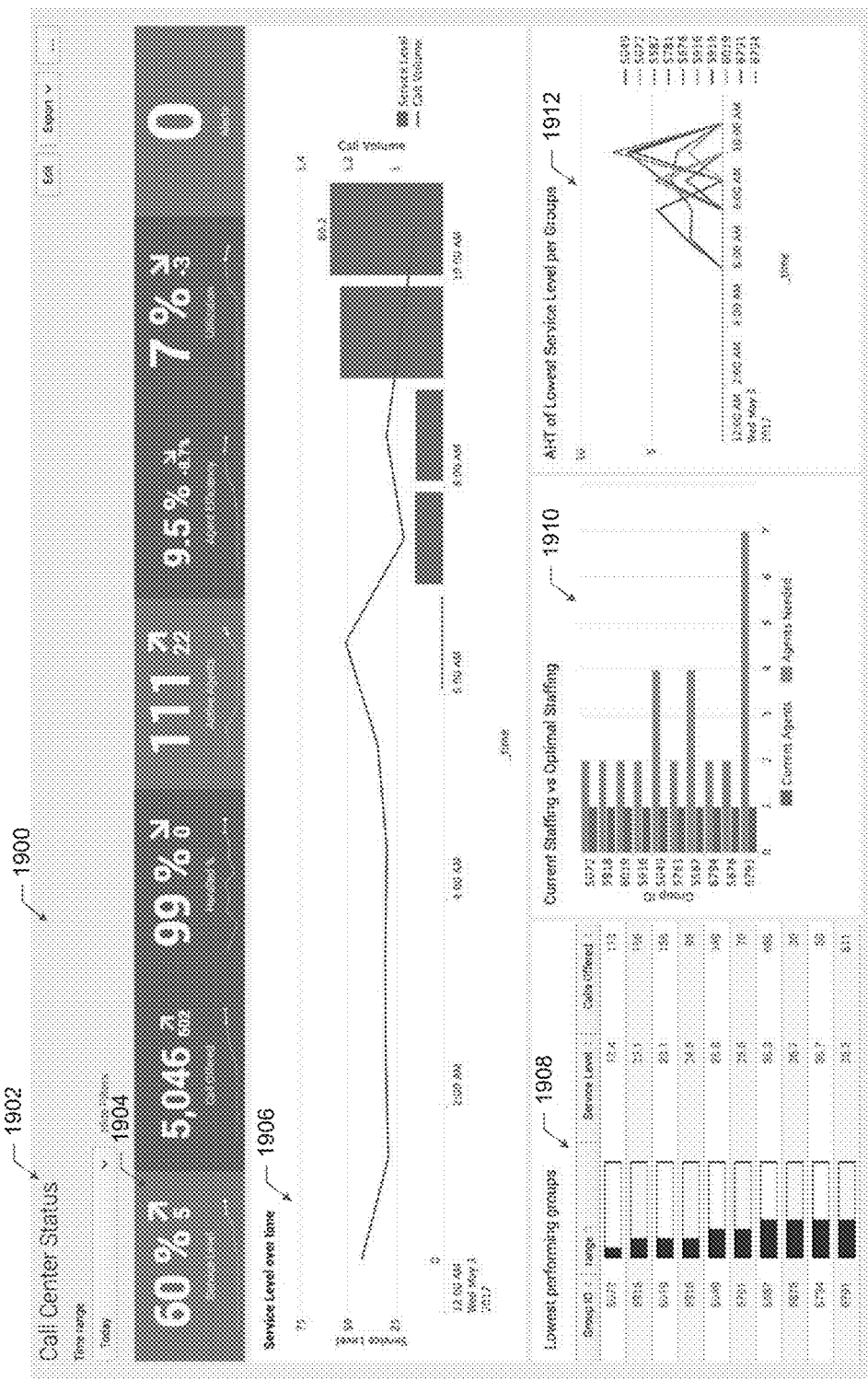
FIGS. 19-22 are example graphical user interfaces in accordance with the disclosed embodiments.

FIG. 19 is an example graphical user interface 1900 generated using the general interface in accordance with the disclosed embodiments. In FIG. 19, the graphical user interface 1900 includes the title 1902 of call center status. The select button for service level 1904 is selected. Because service level 1904 is selected, the subhierarchy corresponds to interaction metrics related to service level. As shown, the other possible interaction metrics to select includes calls offered, handled, active agents, and agent efficiency. Each interaction metric may have a corresponding value presented in the graphical user interface 1900 that is defined for the entire call center. The second tier corresponds to a node of the service level subhierarchy including parameters of a graph for service level over time. When rendered after performing the operations described above to obtain the interaction metrics, the graph 1906 is displayed. The third tier corresponds to multiple nodes that are child nodes of the service level over time. For example, one node includes in the visualization parameters of a chart for service level per group. When rendered after performing the operations described above with reference to FIG. 11, chart 1908 is displayed. Another node includes parameters of a chart for current staffing to target staffing per group. When rendered after performing the operations described above with reference to FIG. 13, chart 1910 is displayed. Another node includes parameters of a graph for service level over time per group. When rendered after performing the operations described above with reference to FIG. 11, graph 1912 is displayed.

Figure 20:
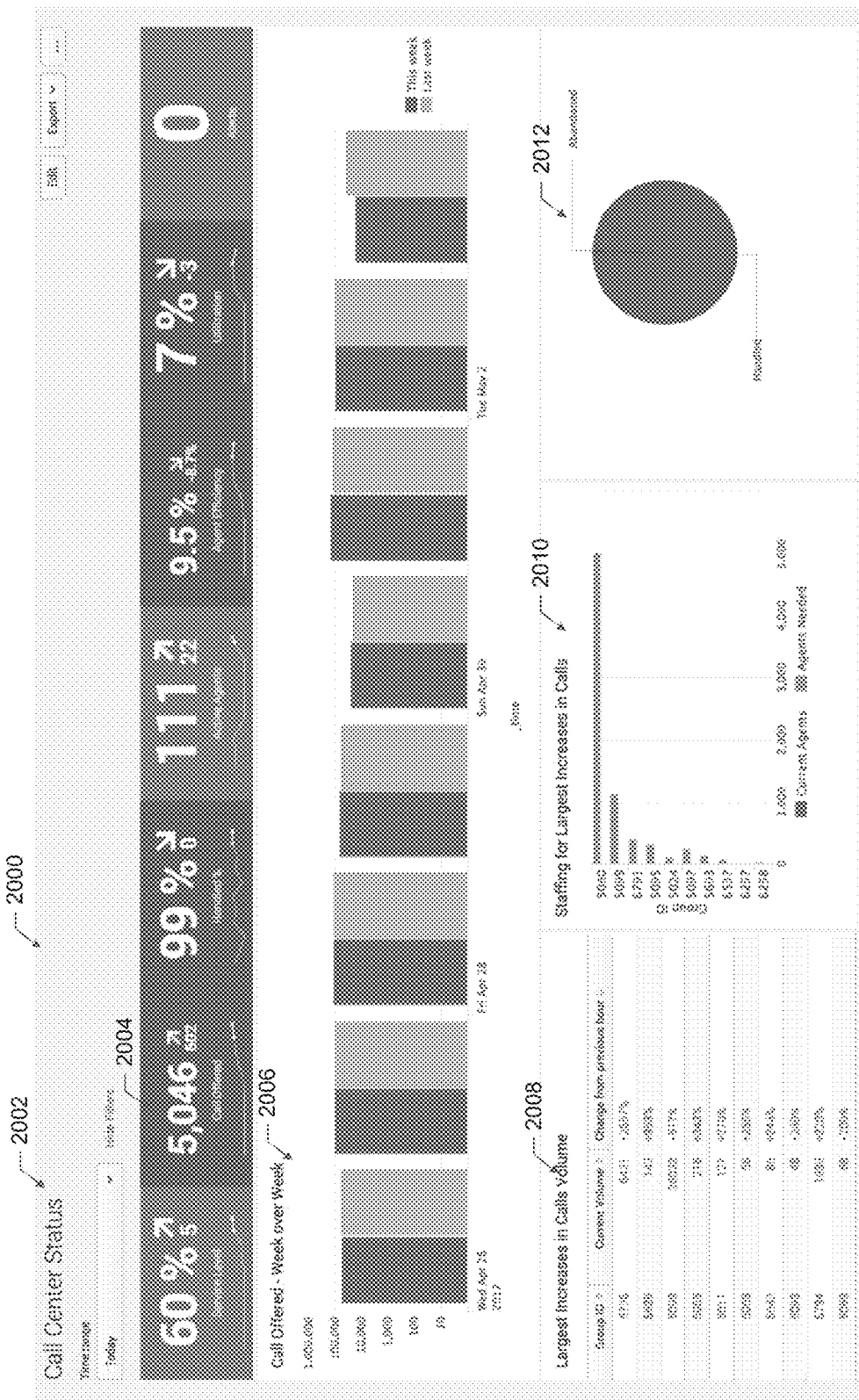

FIG. 20 is an example graphical user interface 2000 generated using the general interface in accordance with the disclosed embodiments. In FIG. 20, the graphical user interface 2000 includes the title 2002 of call center status. The select button for calls offered 2004 is selected. Because calls offered 2004 is selected, the subhierarchy corresponds to interaction metrics related to calls offered. The second tier corresponds to a node of the calls offered subhierarchy including parameters of a graph for call volume. When rendered after performing the operations described above to obtain the interaction metrics, the graph 2006 is displayed. The third tier corresponds to multiple nodes that are child nodes of the call volume over time. For example, one node includes in the visualization parameters of a chart for increase in call volume per group. When rendered after performing the operations described above with reference to FIG. 11, chart 2008 is displayed. Another node includes parameters of a target staffing for call volume per group. When rendered after performing the operations described above with reference to FIG. 13, chart 2010 is displayed. Another node includes parameters of a graph for number of abandoned calls and processed calls. When rendered after performing the operations described above with reference to FIG. 11, graph 2012 is displayed.

Figure 21:

FIG. 21 is an example graphical user interface 2100 generated using another general interface in accordance with the disclosed embodiments. In FIG. 21, the graphical user interface 2100 includes the title 2102 of Peer Groups-Agent Groups. In other words, information about peer groups is selected as the first node. Various visualizations are provided in the first tier 2106 that span the call center. The second tier includes a chart 2108 of calls per time period per group. After performing the operations discussed above with reference to FIG. 11, chart 2108 is displayed.

Figure 22:
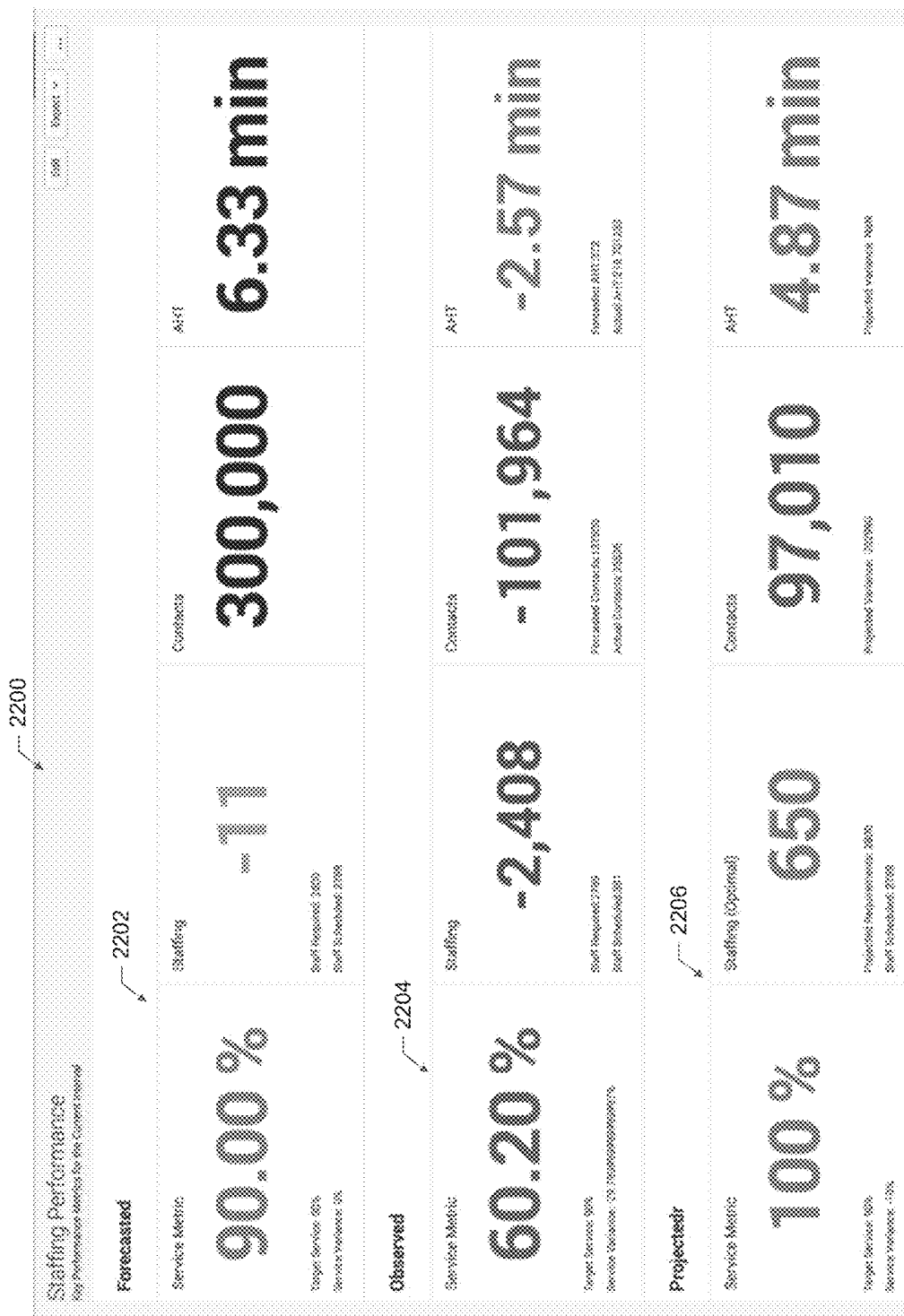

FIG. 22 is an example graphical user interface 2200 presenting staffing performance in accordance with the disclosed embodiments. The top row 2202 presents visualizations of the expected volume and staffing for the current day. The second row 2204 presents current interaction metrics including the current service level, the current staffing versus planned staffing, and a comparison of the call volume to forecasted volume. The third row 2206 presents projected interaction metrics for the remainder of the time period (i.e., the current day in the example). The third row 2206 may be generated using machine learning to project call volume for the rest of the day based on current volume. The resulting projection may be used to calculate target staffing levels for the remainder of the day, which is presented in the graphical user interface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of generating a graphical user interface, the method comprising:
    obtaining a metric interface hierarchy comprising a plurality of nodes, each node of the plurality of nodes representing an interaction metric and defining a visualization for the node, the metric interface hierarchy defining an ordering on the plurality of nodes;
    traversing the metric interface hierarchy starting with a selected node to obtain a subhierarchy;
    creating the graphical user interface from a general interface by, for each node of the subhierarchy:
        obtaining an interaction metric for the node,
        creating the visualization of the interaction metric as defined for the node, and
        populating the general interface with the visualization of the interaction metric,
            wherein the general interface defines a dynamically adjustable layout of panes, and
            wherein populating the general interface comprises adding the visualization of the interaction metric to a pane matching a location of the node in the ordering defined by the metric interface hierarchy; and
    providing the graphical user interface.

2. The method of claim 1, wherein the general interface comprises:
    a plurality of filter buttons, the plurality of filter buttons for applying a filter function to a calculation of metrics defined by at least one node of the subhierarchy.

3. The method of claim 1, wherein the general interface comprises:
    a second tier for displaying the visualization of a root node of the subhierarchy, the root node being in the plurality of nodes;
    a third tier for displaying the visualization of each direct child node of the root node, the each direct child node being in the plurality of nodes, the third tier disposed under the second tier; and
    a fourth tier for displaying the visualization of each leaf node of the subhierarchy, the each leaf node being in the plurality of nodes, the fourth tier disposed under the third tier.

4. The method of claim 1, wherein the subhierarchy comprises:
    a first node comprising parameters of a graph for service level over time,
    a second node comprising parameters of a chart for service level per group,
    a third node comprising parameters of a chart for current staffing to target staffing per group, and
    a fourth node comprising parameters of a graph for service level over time per group,
    wherein the second node, the third node, and the fourth node are children nodes of the first node in the subhierarchy.

5. The method of claim 1, wherein the metric interface hierarchy comprises:
    a first node comprising parameters of a graph for call volume,
    a second node comprising parameters of a chart for increase in call volume per group,
    a third node comprising parameters of a chart for target staffing for call volume per group, and
    a fourth node comprising parameters of a graph for number of abandoned calls and processed calls,
    wherein the second node, the third node, and the fourth node are children nodes of the first node in the metric interface hierarchy.

6. The method of claim 1, wherein the metric interface hierarchy comprises:
    a first node comprising a visualization of calls offered per time period, and
    a second node comprising parameters of a chart for calls per time period per group.

7. The method of claim 1, further comprising:
    querying a data store for current interaction data between a plurality of call center personnel and a plurality of customers, the plurality of call center personnel grouped into a plurality of call center groups;
    determining, for at least some call center groups of the plurality of call center groups, a current interaction metric specific to the call center group; and
    populating the visualization using the current interaction metric for each of the at least some call center groups.

8. The method of claim 1, further comprising:
    querying a data store comprising raw machine data for a call center, the raw machine data defining a plurality of interactions between a plurality of call center personnel and a plurality of customers;

determining a current interaction metric specific; and
populating the visualization using the current interaction metric.

9. The method of claim 1, further comprising:
obtaining a third party data describing an environment affecting at least some of a plurality of customers;
predicting an effect on the call center based on the environment,
determining a future interaction metric for a call center using current interaction data and the effect on the call center, and
populating the visualization using the future interaction metric.

10. The method of claim 1, further comprising:
determining an expected volume of calls for a time period,
obtaining current interaction data describing a performance of a call center within the time period to a current point in time;
predicting, based at least in part on the current interaction data and the expected volume of calls, a future volume of calls to the call center for a remainder of the time period, the remainder of the time period being after the current point in time;
determining a current interaction metric using the future volume of calls; and
displaying the current interaction metric and the expected volume of calls in the graphical user interface.

11. A system comprising:
memory comprising instructions; and
a computer processor for executing the instructions that cause the computer processor to perform operations comprising:
obtaining a metric interface hierarchy comprising a plurality of nodes, each node of the plurality of nodes representing an interaction metric and defining a visualization for the node, the metric interface hierarchy defining an ordering on the plurality of nodes,
traversing the metric interface hierarchy starting with a selected node to obtain a subhierarchy,
creating a graphical user interface from a general interface by, for each node of the subhierarchy:
obtaining an interaction metric for the node,
creating the visualization of the interaction metric as defined for the node,
populating the general interface with the visualization of the interaction metric,
wherein the general interface defines a dynamically adjustable layout of panes, and
wherein populating the general interface comprises adding the visualization of the interaction metric to a pane matching a location of the node in the ordering defined by the metric interface hierarchy, and
providing the graphical user interface.

12. The system of claim 11, wherein the general interface comprises:
a plurality of filter buttons, the plurality of filter buttons for applying a filter function to a calculation of metrics defined by at least one node of the subhierarchy.

13. The system of claim 11, wherein the general interface comprises:
a second tier for displaying the visualization of a root node of the subhierarchy, the root node being in the plurality of nodes;
a third tier for displaying the visualization of each direct child node of the root node, the each direct child node being in the plurality of nodes, the third tier disposed under the second tier; and
a fourth tier for displaying the visualization of each leaf node of the subhierarchy, the each leaf node being in the plurality of nodes, the fourth tier disposed under the third tier.

14. The system of claim 11, wherein the subhierarchy comprises:
a first node comprising parameters of a graph for service level over time,
a second node comprising parameters of a chart for service level per group,
a third node comprising parameters of a chart for current staffing to target staffing per group, and
a fourth node comprising parameters of a graph for service level over time per group,
wherein the second node, the third node, and the fourth node are children nodes of the first node in the subhierarchy.

15. The system of claim 11, wherein the metric interface hierarchy comprises:
a first node comprising parameters of a graph for call volume,
a second node comprising parameters of a chart for increase in call volume per group,
a third node comprising parameters of a chart for target staffing for call volume per group, and
a fourth node comprising parameters of a graph for number of abandoned calls and processed calls,
wherein the second node, the third node, and the fourth node are children nodes of the first node in the metric interface hierarchy.

16. The system of claim 11, wherein the metric interface hierarchy comprises:
a first node comprising a visualization of calls offered per time period, and
a second node comprising parameters of a chart for calls per time period per group.

17. The system of claim 11, wherein the operations further comprise:
querying a data store for current interaction data between a plurality of call center personnel and a plurality of customers, the plurality of call center personnel grouped into a plurality of call center groups;
determining, for at least some call center groups of the plurality of call center groups, a current interaction metric specific to the call center group; and
populating the visualization using the current interaction metric for each of the at least some call center groups.

18. The system of claim 11, wherein the operations further comprise:
querying a data store comprising raw machine data for a call center, the raw machine data defining a plurality of interactions between a plurality of call center personnel and a plurality of customers;
determining a current interaction metric specific; and
populating the visualization using the current interaction metric.

19. The system of claim 11, wherein the operations further comprise:
obtaining a third party data describing an environment affecting at least some of a plurality of customers;
predicting an effect on the call center based on the environment, determining a future interaction metric for a call center using current interaction data and the effect on the call center, and populating the visualization using the future interaction metric.

20. The system of claim 11, wherein the operations further comprise:

determining an expected volume of calls for a time period, obtaining current interaction data describing a performance of a call center within the time period to a current point in time;

predicting, based at least in part on the current interaction data and the expected volume of calls, a future volume of calls to the call center for a remainder of the time period, the remainder of the time period being after the current point in time;

determining a current interaction metric using the future volume of calls; and displaying the current interaction metric and the expected volume of calls in a graphical user interface.

21. A non-transitory computer-readable storage medium storing computer-readable program code which, when executed by one or more processors, cause the one or more processors to perform operations, comprising:

obtaining a metric interface hierarchy comprising a plurality of nodes, each node of the plurality of nodes representing an interaction metric and defining a visualization for the node, the metric interface hierarchy defining an ordering on the plurality of nodes;

traversing the metric interface hierarchy starting with a selected node to obtain a subhierarchy;

creating a graphical user interface from a general interface by, for each node of the subhierarchy:

obtaining an interaction metric for the node, creating the visualization of the interaction metric a defined for the node, and populating the general interface with the visualization of the interaction metric, wherein the general interface defines a dynamically adjustable layout of panes, and wherein populating the general interface comprises adding the visualization of the interaction metric to a pane matching a location of the node in the ordering defined by the metric interface hierarchy; and providing the graphical user interface.

22. The non-transitory computer readable medium of claim 21, wherein the general interface comprises:

a plurality of filter buttons, the plurality of filter buttons for applying a filter function to a calculation of metrics defined by at least one node of the subhierarchy.

23. The non-transitory computer readable medium of claim 21, wherein the general interface comprises:

a second tier for displaying the visualization of a root node of the subhierarchy, the root node being in the plurality of nodes;

a third tier for displaying the visualization of each direct child node of the root node, the each direct child node being in the plurality of nodes, the third tier disposed under the second tier; and a fourth tier for displaying the visualization of each leaf node of the subhierarchy, the each leaf node being in the plurality of nodes, the fourth tier disposed under the third tier.

24. The non-transitory computer readable medium of claim 21, wherein the subhierarchy comprises:

a first node comprising parameters of a graph for service level over time, a second node comprising parameters of a chart for service level per group, a third node comprising parameters of a chart for current staffing to target staffing per group, and a fourth node comprising parameters of a graph for service level over time per group, wherein the second node, the third node, and the fourth node are children nodes of the first node in the subhierarchy.

25. The non-transitory computer readable medium of claim 21, wherein the metric interface hierarchy comprises:

a first node comprising parameters of a graph for call volume, a second node comprising parameters of a chart for increase in call volume per group, a third node comprising parameters of a chart for target staffing for call volume per group, and a fourth node comprising parameters of a graph for number of abandoned calls and processed calls, wherein the second node, the third node, and the fourth node are children nodes of the first node in the metric interface hierarchy.

26. The non-transitory computer readable medium of claim 21, wherein the metric interface hierarchy comprises:

a first node comprising a visualization of calls offered per time period, and a second node comprising parameters of a chart for calls per time period per group.

27. The non-transitory computer readable medium of claim 21, wherein the operations further comprise:

querying a data store for current interaction data between a plurality of call center personnel and a plurality of customers, the plurality of call center personnel grouped into a plurality of call center groups;

determining, for at least some call center groups of the plurality of call center groups, a current interaction metric specific to the call center group; and populating the visualization using the current interaction metric for each of the at least some call center groups.

28. The non-transitory computer readable medium of claim 21, wherein the operations further comprise:

querying a data store comprising raw machine data for a call center, the raw machine data defining a plurality of interactions between a plurality of call center personnel and a plurality of customers;

determining a current interaction metric specific; and populating the visualization using the current interaction metric.

29. The non-transitory computer readable medium of claim 21, wherein the operations further comprise:

obtaining a third party data describing an environment affecting at least some of a plurality of customers;

predicting an effect on the call center based on the environment, determining a future interaction metric for a call center using current interaction data and the effect on the call center, and populating the visualization using the future interaction metric.

30. The non-transitory computer readable medium of claim 21, wherein the operations further comprise:
- determining an expected volume of calls for a time period,
- obtaining current interaction data describing a performance of a call center within the time period to a current point in time;
- predicting, based at least in part on the current interaction data and the expected volume of calls, a future volume of calls to the call center for a remainder of the time period, the remainder of the time period being after the current point in time;
- determining a current interaction metric using the future volume of calls; and
- displaying the current interaction metric and the expected volume of calls in a graphical user interface.

* * * * *